United States Patent
Johnson et al.

(10) Patent No.: US 9,362,972 B2
(45) Date of Patent: *Jun. 7, 2016

(54) METALLIC PROTECTIVE CASE FOR ELECTRONIC DEVICE

(71) Applicant: Otter Products, LLC, Fort Collins, CO (US)

(72) Inventors: Jamie L. Johnson, Fort Collins, CO (US); Aaron M. Gaylord, Fort Collins, CO (US); Julie T. Pettit, Fort Collins, CO (US); John P. Fitzgerald, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,213

(22) Filed: Jan. 4, 2016

(65) Prior Publication Data

US 2016/0119014 A1    Apr. 28, 2016

Related U.S. Application Data

(63) Continuation of application No. 14/590,948, filed on Jan. 6, 2015, now Pat. No. 9,264,090.

(60) Provisional application No. 61/924,699, filed on Jan. 7, 2014.

(51) Int. Cl.
| | |
|---|---|
| *H04B 1/38* | (2015.01) |
| *H04B 1/3888* | (2015.01) |
| *H04M 1/02* | (2006.01) |
| *A45C 11/00* | (2006.01) |

(52) U.S. Cl.
CPC .............. *H04B 1/3888* (2013.01); *A45C 11/00* (2013.01); *H04M 1/0206* (2013.01); *A45C 2011/002* (2013.01)

(58) Field of Classification Search
CPC .................... H04B 1/3888; H04B 2001/3894; H04M 1/185
USPC .............. 455/63.1, 501, 575.1, 575.3, 575.4, 455/575.8, 90.3
See application file for complete search history.

(56) References Cited

U.S. PATENT DOCUMENTS

| | | |
|---|---|---|
| 6,249,256 B1 | 6/2001 | Luxon et al. |
| 7,876,272 B2 | 1/2011 | Dou et al. |
| 8,054,231 B2 | 11/2011 | Ahn et al. |
| 8,204,559 B2 | 6/2012 | Honma |
| 8,208,980 B2 | 6/2012 | Wong et al. |
| 8,214,003 B2 | 7/2012 | Wong et al. |
| 8,442,602 B2 | 5/2013 | Wong et al. |
| 8,750,948 B2 | 6/2014 | Wong et al. |
| 9,264,090 B2 * | 2/2016 | Johnson ............... H04B 1/3888 |
| 2003/0045246 A1 | 3/2003 | Lee et al. |
| 2006/0022889 A1 | 2/2006 | Chiang et al. |

(Continued)

*Primary Examiner* — Tuan Pham

(57) ABSTRACT

A protective case for an electronic device having an antenna includes a first case member and a second case member. The first case member includes at least two metallic case portions joined to each other by at least one electrical insulator segment that electrically isolates the at least two metallic case portions from each other to reduce electromagnetic interference between the first case member and the antenna of the electronic device. The second case member that attaches to the first case member to form an enclosure that at least partially encloses the electronic device when the electronic device is installed in the protective case.

20 Claims, 22 Drawing Sheets

(56) References Cited

U.S. PATENT DOCUMENTS

| | | | |
|---|---|---|---|
| 2009/0312058 A9 * | 12/2009 | Wood | H04B 1/3888 455/566 |
| 2012/0329535 A1 | 12/2012 | Kuo | |
| 2014/0066142 A1 * | 3/2014 | Gipson | H04B 1/3888 455/575.8 |
| 2015/0011273 A1 | 1/2015 | Wilmhoff et al. | |
| 2015/0038200 A1 * | 2/2015 | Kennard | A45C 11/00 455/575.8 |

* cited by examiner

METALLIC PROTECTIVE CASE FOR ELECTRONIC DEVICE

CROSS REFERENCE TO RELATED APPLICATIONS

This application is a continuation of pending U.S. patent application Ser. No. 14/590,948, filed Jan. 6, 2015, which claims priority to U.S. Provisional Patent Application 61/924,699, filed Jan. 7, 2014, the contents of which are incorporated by reference in their entireties.

FIELD

This application relates to protective cases for electronic devices. More specifically, this application relates to metallic protective cases for electronic devices having antennas.

BACKGROUND

Mobile electronic devices, such as mobile phones, cellular phones, smartphones, portable media players, personal computers, e-readers, laptop computers, tablet computers, GPS receivers, two way radios, and audio players, are becoming increasingly important in peoples' day-to-day activities. People increasingly rely on mobile electronic devices to communicate with others, engage in commerce, retrieve information, listen to music, watch videos, and manage personal calendars, just to name a few. Due to the relatively high cost of mobile electronic devices, there is a strong incentive to protect these devices from physical damage. Physical damage may occur to due to dropping, impact, shock, water, snow, dust, exposure to abrasive materials, exposure to corrosive substances, and/or other damaging elements or forces. Physical damage may cause electronic devices to become inoperational and electronic devices can be expensive and/or inconvenient to replace. Protective cases may be used with electronic devices to reduce the risk of damage. Protective cases may be made from many different types of materials. Metallic protective cases for electronic devices have a number of desirable characteristics but may interfere with or otherwise affect performance of one or more antennas of the electronic devices.

SUMMARY

A protective case for an electronic device having an antenna is provided. The protective case includes a first case member and a second case member. The first case member includes at least two metallic case portions joined to each other by at least one electrical insulator segment that electrically isolates the at least two metallic case portions from each other to reduce electromagnetic interference between the first case member and the antenna of the electronic device. The second case member that attaches to the first case member to form an enclosure that at least partially encloses the electronic device when the electronic device is installed in the protective case.

In another embodiment, a protective cover for an electronic device having an antenna includes a case member having a cavity for receiving the electronic device. The case member at least partially encloses the electronic device when the electronic device is installed in the cavity of the case member. The case member includes at least two case portions that each have one or more metallic materials joined to each other by a dielectric material that electrically isolates the at least two case portions from each other to reduce any electromagnetic interference between the case member and the antenna of the electronic device when the electronic device is installed in the protective cover.

In yet another embodiment, a metallic cover for an electronic device includes a first metallic case member, a second metallic case member, and one or more dielectric elements. The first metallic case member includes a first latching feature and an aperture for accessing the interactive touchscreen of the electronic device when the electronic device is installed in the metallic cover. The second metallic case member includes at least two metallic case portions and is hingedly attached to the first metallic case member to form a hinged enclosure. The hinged enclosure receives the electronic device when the hinged enclosure is in an open position and at least partially encloses the electronic device when the hinged enclosure is in the closed position. The second metallic case member includes a second latching feature adapted to engage first latching feature of the first metallic case member to secure the hinged enclosure in the closed position. The dielectric elements join the at least two metallic case portions of the second metallic case member and are adapted to electrically isolate the at least two metallic case portions to reduce electromagnetic interference between the metallic cover and an antenna of the electronic device.

In yet another embodiment, a metallic protective case for an electronic device having an antenna structure includes a first metallic case portion and a second metallic case portion. The first metallic case portion is adapted to fit over a front portion of the electronic device. The first metallic case portion includes a first top portion, a first right side portion, a first left side portion, and a first bottom portion, wherein the first top portion is connected to the first left side portion by a first dielectric portion and is connected to the first right side portion by a second dielectric portion. The first bottom portion is connected to the first right side portion by a third dielectric portion and is connected to the first left side portion by a fourth dielectric portion. The second metallic case portion is adapted to fit over a rear portion of an electronic device and attachable to the first metallic case portion to provide an enclosure adapted to receive an electronic device. The second metallic case portion includes a second top portion, a second right side portion, a second left side portion, and a second bottom portion, wherein the second top portion is connected to the second left side portion by a fifth dielectric portion and is connected to the second right side portion by a sixth dielectric portion. The second bottom portion is connected to the second right side portion by a seventh dielectric portion and is connected to the second left side portion by an eighth dielectric portion. Additional embodiments and variations of these embodiments are disclosed and discussed herein.

BRIEF DESCRIPTIONS OF DRAWINGS

DETAILED DESCRIPTION

Figure 1:
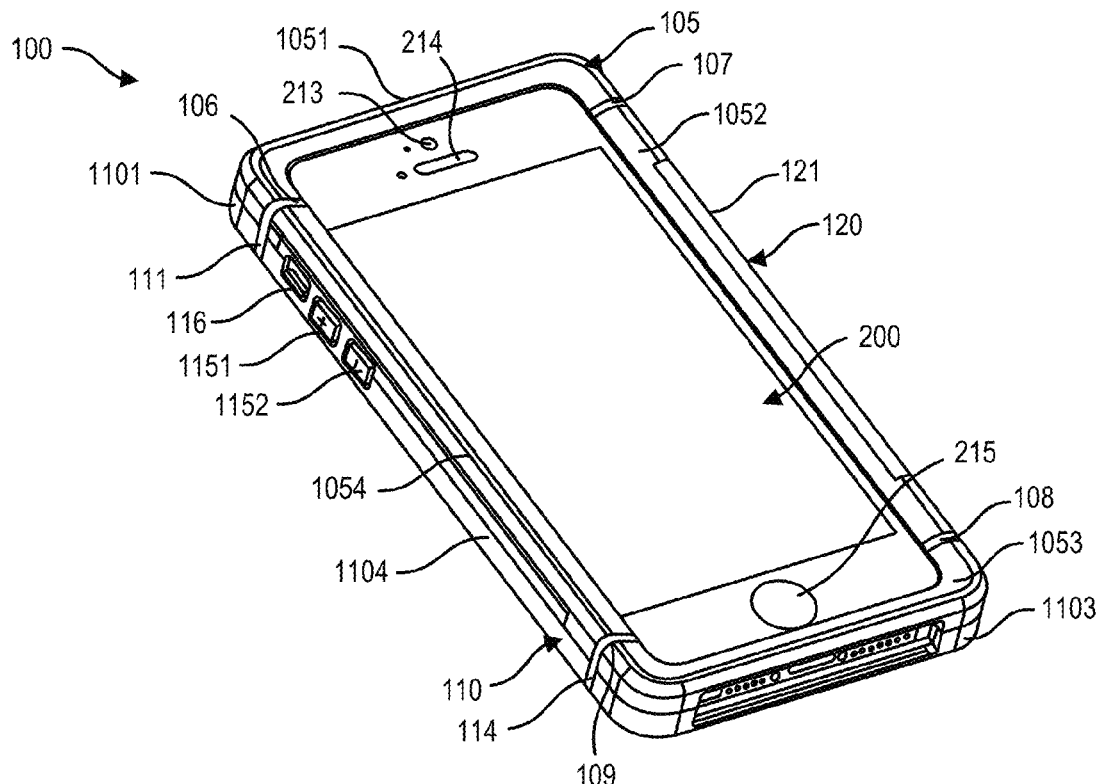
FIG. 1 illustrates a front perspective view of a metallic protective case housing an electronic device.

Protective cases may be provided for electronic devices, such as mobile phones, cellular phones, smartphones, portable media players, personal computers, e-readers, laptop computers, tablet computers, audio players, GPS receivers, and two way radios and can be made of a wide variety of materials, including plastic, rubber, polymers, silicone, glass, ceramic, composite, and/or wood. In some instances, protective cases have also been made of one or more metals or metallic materials. Metal cases have many desirable attributes, such as being extremely strong and durable. Metal or metallic protective cases or covers may also be desirable from an aesthetic standpoint.

Increasingly, the types of portable electronic and computing devices described above make use of one or more forms of wireless communication. In most instances, wireless communication involves the use of one or more radio frequency (RF) transceivers and antennas. Many of these electronic devices are designed and manufactured with plastic external housings and the antenna(s) used by the devices are often mounted inside these plastic housings. The plastic housings typically have only a small effect on the performance of the antenna or no effect on the performance of the antenna at all. It is important to reduce any electromagnetic interference with the antenna caused by a housing or case because the communication signals used by these devices often have low power levels and/or are relatively weak and can be significantly impacted by even relatively small amounts of interference. The communication signals often have low power levels to preserve battery power and/or to maintain compliance with a particular wireless communication standard.

Electronic devices are also sometimes designed and manufactured with housings that are metallic, or partially metallic. In these situations, the integral metallic electronic device housing may contain features designed to reduce any electromagnetic interference caused by the metallic housing. Because they may be designed together and/or by a single manufacturer, the antenna structure of an electronic device having a metallic housing and the metallic housing itself may be cooperatively designed and/or configured to reduce or minimize any interference effects caused by the integral metallic housing.

Unfortunately, metal cases placed on an electronic device after the electronic device has been designed, manufactured, and/or distributed may electromagnetically interfere with the operation of the RF transceiver and/or the antenna of the electronic device. This interference may result in dropped calls, poor reception, weak transmit or receive signals, inability to establish a wireless connection, reduced data transfer rates, and/or other issues associated with reduced antenna performance. Metallic protective cases, covers, and enclosures are disclosed herein that overcome one or more of these issues and/or reduces the effect these metallic protective cases, covers, and enclosures have on the operation of the electronic device.

FIG. 1 illustrates a front perspective view of a metallic protective case 100 housing an electronic device 200. Electronic device 200 may be a mobile phone, cellular phone, smartphone, portable media player, personal computer, e-reader, laptop computer, tablet computer, GPS receiver, two way radio, audio player, or a combination thereof. Electronic device 200 may include one or more antennas to support communications in one or more frequency bands. For instance, the electronic device 200 may include an antenna to support cellular telephone communications, local area network (LAN) communications, Wireless Fidelity (WiFi) communications, global positioning system (GPS) communications, Bluetooth communications, Bluetooth Low Energy communications, near field communication (NFC), and/or other forms of wireless communication, including combinations thereof.

Electronic device 200 may include any type of suitable antenna structures, such as dipole, short dipole, half-wave dipole, monopole, patch, reflector, microstrip, planar inverted-F, helical, slot, or loop antenna structures. Different types of antenna structures may be used for different communications bands, different types of communications, and/or different combinations of communication types and bands. For example, one type of antenna may be used for cellular connections while another is used for Bluetooth communications. In some cases, multiple antennas may be used to support a single communication band or type, such as for purposes of antenna diversity. Each antenna may be configured for transmission of signals, for receptions of signals, or both.

Figure 2:
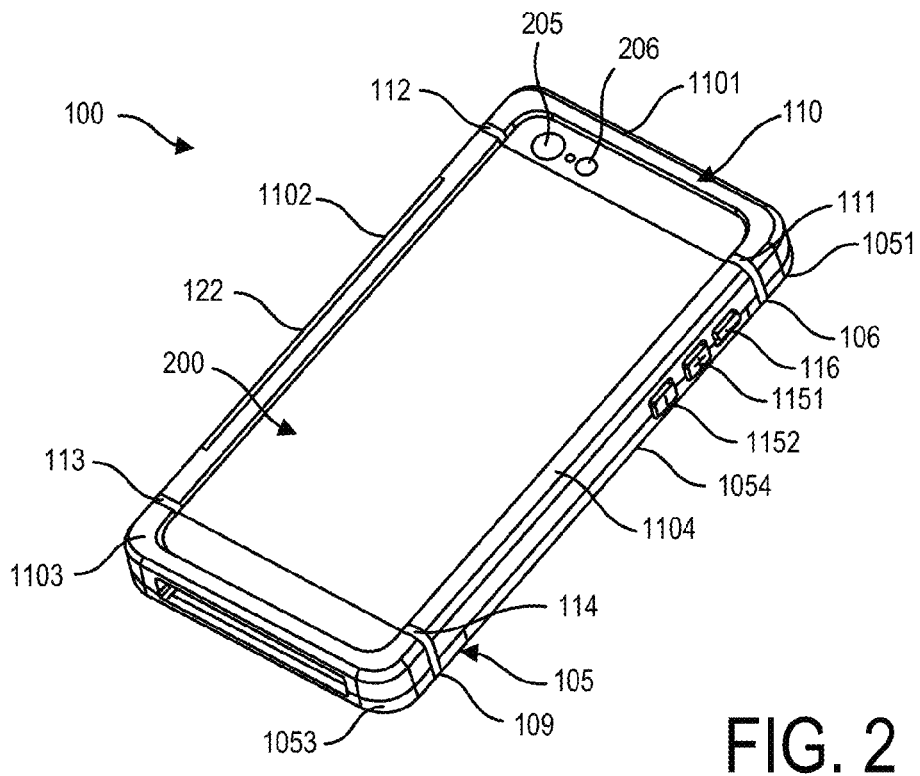
FIG. 2 illustrates a rear perspective view of a metallic protective case housing an electronic device.
Figure 3:
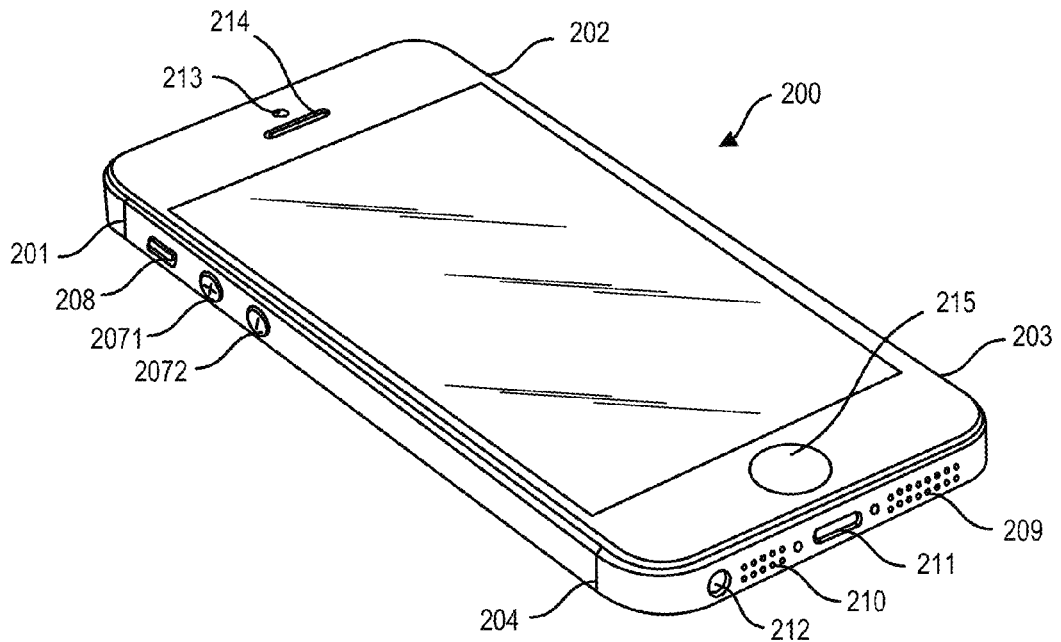
FIG. 3 illustrates a front perspective view of an electronic device having a radio-frequency transceiver circuit and an antenna structure within the electronic device.
Figure 4:
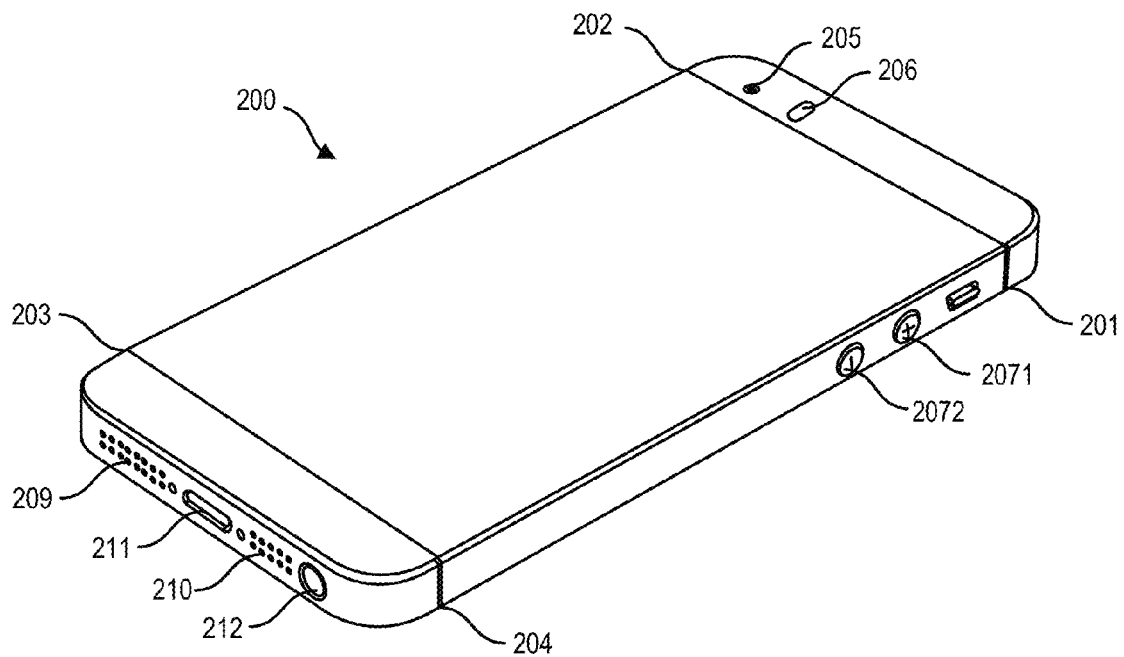
FIG. 4 illustrates a rear perspective view of an electronic device having a radio-frequency transceiver circuit and an antenna structure within the electronic device.

FIG. 3 illustrates a front view of electronic device 200 without a protective case installed. FIG. 4 illustrates a rear view of electronic device 200 without the protective case installed. Electronic device 200 includes a camera 205 and a flash 206 on a back surface of the electronic device. Electronic device 200 also includes forward facing camera 213 on a front surface of the electronic device. Electronic device 200 can also include a microphone 210, a first speaker 209, a second speaker 214, an audio jack 212, a power button 217, a first volume button 2071, a second volume button 2072, a mute rocker switch 208, a power and/or data port 211, and a home button 215. In some cases, home button 215 may incorporate a biometric sensor, such as a fingerprint scanner, to prevent unauthorized use of electronic device 200. It should be understood that the cases disclosed herein may be used with a number of other different types of electronic and/or with electronic devices having features other than those illustrated in FIGS. 2 and 3.

A metallic structure placed near or around an antenna can have significant negative impacts on the performance of that antenna and/or the transceiver associated with that antenna. This is particularly true if these components were not designed, positioned, or configured with knowledge of the size or placement of the metallic structure. Consequently, aftermarket protective cases that are metallic or have metallic structures can significantly impact the wireless communication performance of electronic devices. Generally, the smaller a metal or metallic structure is the less electromagnetic interference or impact it will have on the performance of a nearby antenna. In some cases, separating a relatively large conductive metallic component or surface into smaller metallic components or surfaces that are conductively separated from each other and/or are not metallically contiguous with each other can reduce the electromagnetic interference or impact cause by the metallic component(s). In addition, separating a metallic structure that has a loop or ring structure into several electrically isolated components that are conductively separated from each other and/or are not metallically contiguous with each other can reduce may also reduce undesirable electromagnetic effects.

Among other features, metallic protective case 100 incorporates portions that include an insulating material, such as the insulating segments 106, 107, 108, 109, 111, and 114 illustrated in FIG. 1. The insulating segments or materials may be present into one or more gaps or breaks in the metal structure of the protective case, or portions of the protective case. The sets of electrical insulating materials associated with each portion of a case may be referred to as a group or a set of electrical insulators, a group or set of electrical insulator segments, or a group or set of dielectric elements.

By creating gaps in the structure of the case and filling those gaps with an insulating material, metallic portions of the case are broken into smaller metallic portions that are not conductively attached to each other or are not electrically contiguous with each other. Consequently, the insulators change the electrical properties of protective case 100 such that negative effects it may have on the operation of a wireless radio transceiver and/or an associated antenna of electronic device 200 inside the case are reduced. Reducing or eliminating these effects not only improves the communication capability of electronic device 200 but may also increase the battery life of electronic device 200 relative to use of the electronic device in a metallic case that does not have these features. This is because the transceiver of electronic device 200 is allowed to operate more efficiently and effectively (e.g., at a lower power level) than it would have been able to while in a metallic case without these features.

In the situation where electronic device 200 itself has an integral metallic housing, electronic device 200 can also include one or more insulating or dielectric portions to prevent the case from interfering with the RF performance of the device's antenna or reduce the effects of the metallic housing on the RF performance. For example, as shown in FIGS. 3 and 4, electronic device 200 include a first dielectric portion 201 positioned along a left side surface near the top of the device and a second dielectric portion 202 positioned along a right side surface near the top of the device. Similarly, a third dielectric portion 203 is positioned along the right side surface near the bottom of electronic device and a fourth dielectric portion 204 positioned along the left side surface near the bottom of the device. Although dielectric portions 201-204 of electronic device 200 may improve the performance of the electronic device relative to integral metallic components, the improvements disclosed herein may still be required to maintain or improve performance of the electronic device when the electronic device is place inside a metallic protective case or enclosure.

A dielectric or dielectric material is an electrical insulator that can be polarized by applying an electric field to the material. When the dielectric material is placed in an electric field, electric charges do not flow through the material as they do in a typical electrical conductor. Instead, they cause dielectric polarization or partial dielectric polarization. As a result, positive charges within the dielectric material are displaced toward the electric field and negative charges shift in an opposite direction, thereby creating an internal electric field that reduces the overall field within the dielectric material. The techniques and improvement disclosed herein may be implemented using either insulator or dielectrics. However, in some situations the techniques may be more effective by using dielectrics. While most dielectrics are insulators, the term 'dielectric' typically refers to materials that not only have insulating characteristics but also have a relatively high polarizability.

FIG. 2 illustrates a rear perspective view of metallic protective case 100 housing electronic device 200. As illustrated in FIGS. 1 and 2, metallic protective case 100 can include a first metallic case portion 105 and a second metallic case portion 110. The first metallic case portion 105 is adapted to fit over a front portion of electronic device 200. The second metallic case portion 110 is adapted to fit over a rear portion of electronic device 200. The first metallic case portion 105 can be attached to the second metallic case portion 110 to provide a housing that is adapted to receive the electronic device 200. As illustrated in FIGS. 1 and 2, protective case 100 may have an aperture or opening in one or both of metallic case portions 105 and 110 through which at least a portion of electronic device 200 is visible or accessible when inside protective case 100. As described in further detail below, the opening(s) or aperture(s) may be covered by a transparent, or partially transparent, membrane or sheet.

In some configurations, the metallic case portions may be attached by a hinge, otherwise known as hingedly attached, to form a hinged enclosure that opens and closes. In the open position, an electronic device can be inserted into the case wherein the case encloses or secures the electronic device when in the closed position. The two metallic case portions may also be attached to each other through any suitable methods, such as a snap fit, fasteners, bayonet features, clips, tabs, clasps, interlocking features, multiple hinges, and/or with magnets. In one example, two metallic case members may be held together using one or more screws.

In some configurations, the protective case or cover may include only a single metallic case member, either alone or in combination with one or more non-metallic case members. In other configurations, the protective case or cover may be made up of more than two metallic case portions. In some configurations, less than all of the metallic case portions may be made up of metallic sub-portions that are joined by an insulator or dielectric.

Figure 5:
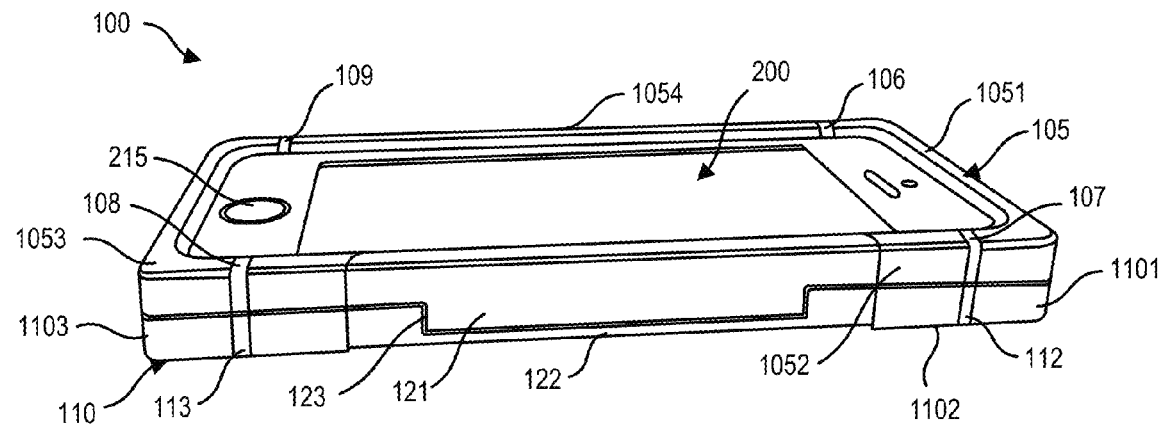
FIG. 5 illustrates a right side perspective view of a metallic protective case containing an electronic device.
Figure 7:
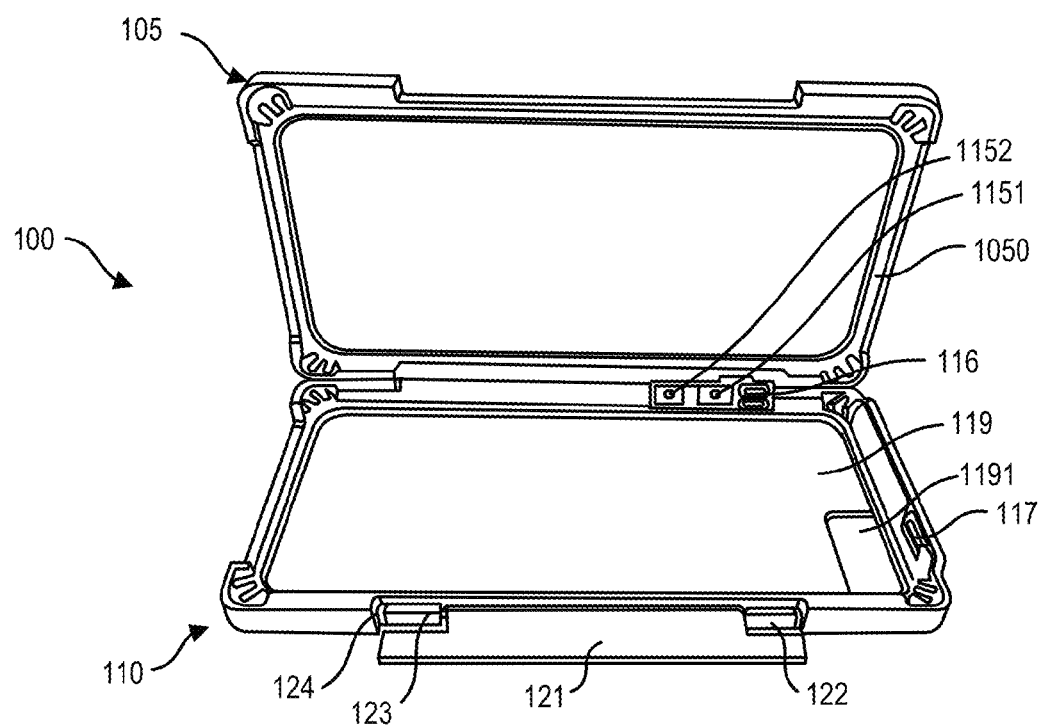
FIG. 7 illustrates a right side perspective view of a metallic protective case in an opened position.
Figure 8:
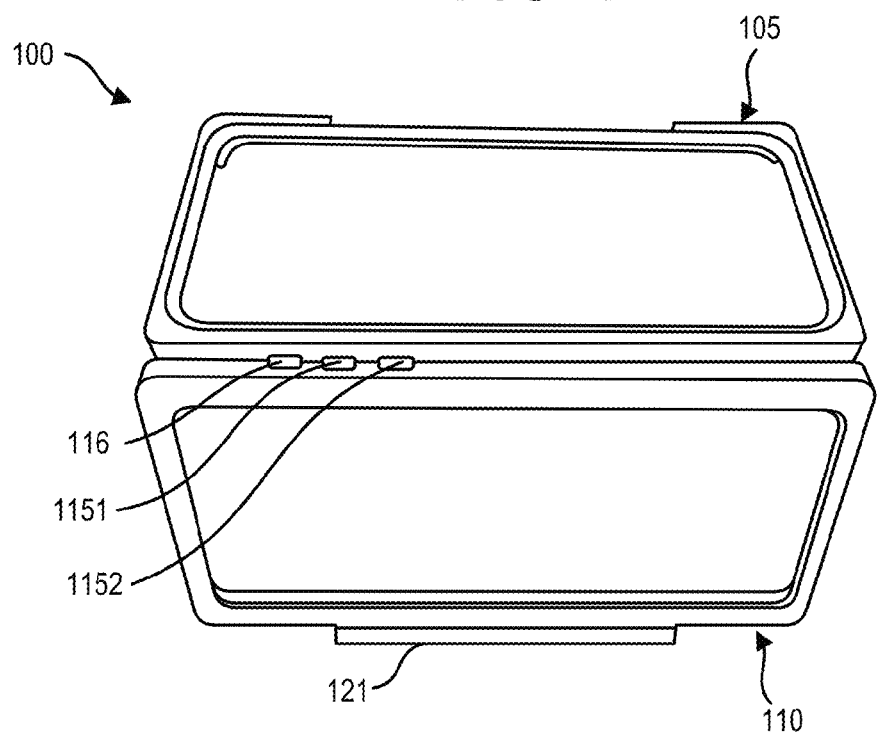
FIG. 8 illustrates a left side perspective view of a metallic protective case in an opened position.
Figure 24A:
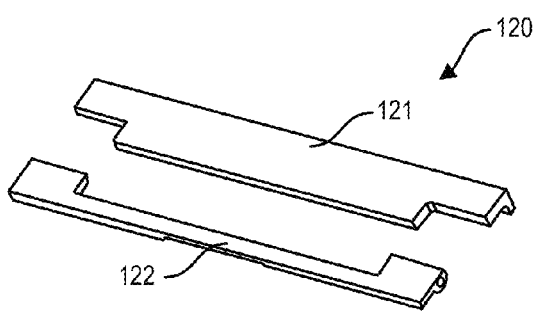
FIG. 24A illustrates components of a latch assembly.
Figure 24B:
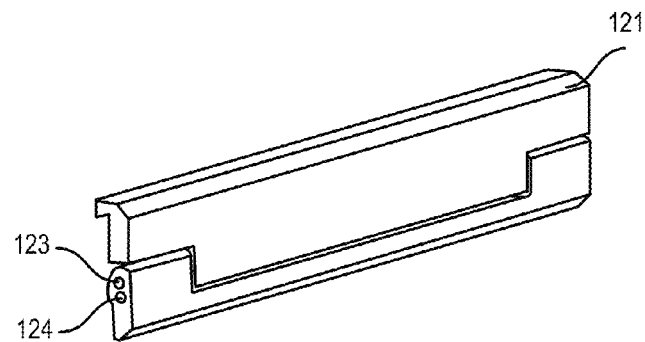
FIG. 24B illustrates assembled components of a latch assembly.

As illustrated in FIG. 1, metallic protective case 100 may include a latch assembly 120 that is adapted to secure the case in a closed position. The latch assembly may include a first latch portion 121 attached to a second latch portion 122, as shown in FIG. 2. FIG. 5 illustrates a right side perspective view metallic protective case 100 and illustrates the relationship between first latch portion 121 and second latch portion 122 when the case is in the closed position. FIG. 7 illustrates a right side perspective view of metallic protective case 100 without electronic device 200 inserted and in the open position. FIG. 7 also illustrates the relationship between the latch portions and metallic protective case 100. FIG. 24A illustrates separate latch portions 121 and 122 before they are attached to each other and to metallic protective case 100. FIG. 24B illustrates latch assembly 120 before it is attached to metallic protective case 100. FIG. 8 illustrates a left side perspective view of metallic protective case 100 in an opened position.

Figure 17A:
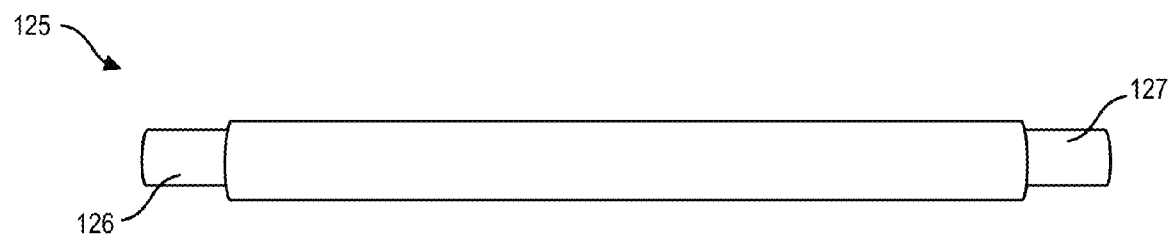
FIG. 17A illustrates a side view female spring bar having a telescoping first end and a telescoping second end.
Figure 17B:
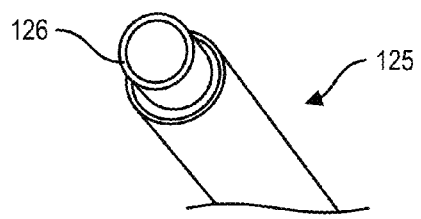
FIG. 17B illustrates an end view of the female spring bar of FIG. 17A.

FIGS. 17A and 17B illustrate examples of a hinge component that can be used to hingedly attach the metallic case portions to each other. FIG. 17A illustrates a side view of a female spring bar 125 and FIG. 17B illustrates a perspective end view of female spring bar 125. Female spring bar 125 can include a first telescoping end 126 and a second telescoping end 127. The telescoping ends may be spring loaded in some cases such that they can be pressed into the body and female spring bar 125 by applying force and configured to relax into the illustrated position when the force is removed. In other words, female spring bar 125 can be inserted into a thru hole, such as thru hole 1105 of FIG. 28D, such that telescoping ends 126 and 127 of female spring bar 125 can be compressed to permit positioning of the first metallic case portion near the second metallic case portion. Once the two metallic case portions are brought together, telescoping ends 126 and 127 can be released, thereby allowing the telescoping ends to extend into a mounting hole, such as mounting hole 1060 (visible in FIG. 26), thereby hingedly connecting the first metallic case portion to the second metallic case portion.

As illustrated in FIG. 7, the latch portions may be connected by a first female spring bar 123 and/or a second female spring bar 124. First female spring bar 123 and second female spring bar 124 are examples of female spring bar 125 although they have different size or configurations than female spring bar 125. In FIG. 7, the second latch portion 122 is attached to the second metallic case portion 110 by second female spring bar 124. The first latch portion 121 is adapted to engage a lip, catch, ledge, or recess on the first metallic case portion 105 to secure the metallic protective case 100 in a closed position. It should be understood that many other types of latches or mechanism for attaching components of the case together are possible. In addition, the latching mechanism(s) and/or hinge(s) may be comprised of one or more insulating or dielectric components for electrically isolating, or further isolating, portions of the metallic case from each other.

Figure 31:
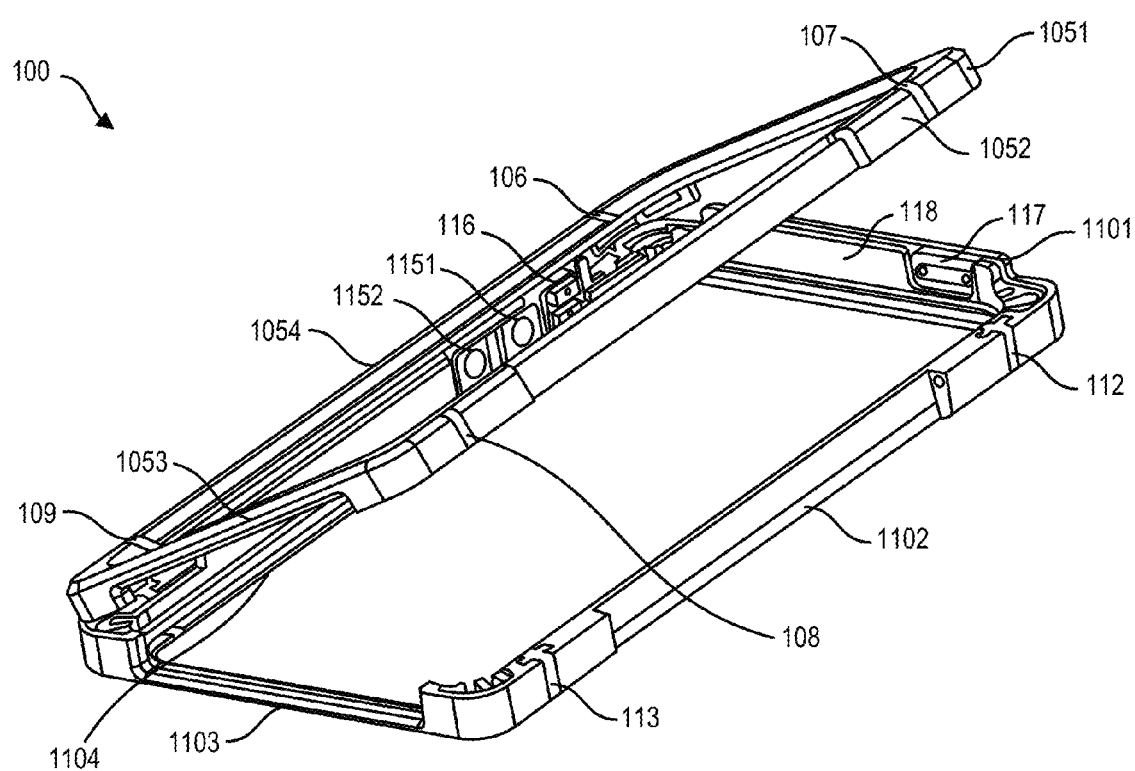
FIG. 31 illustrates a metallic protective case without a latch mechanism installed.
Figure 32:
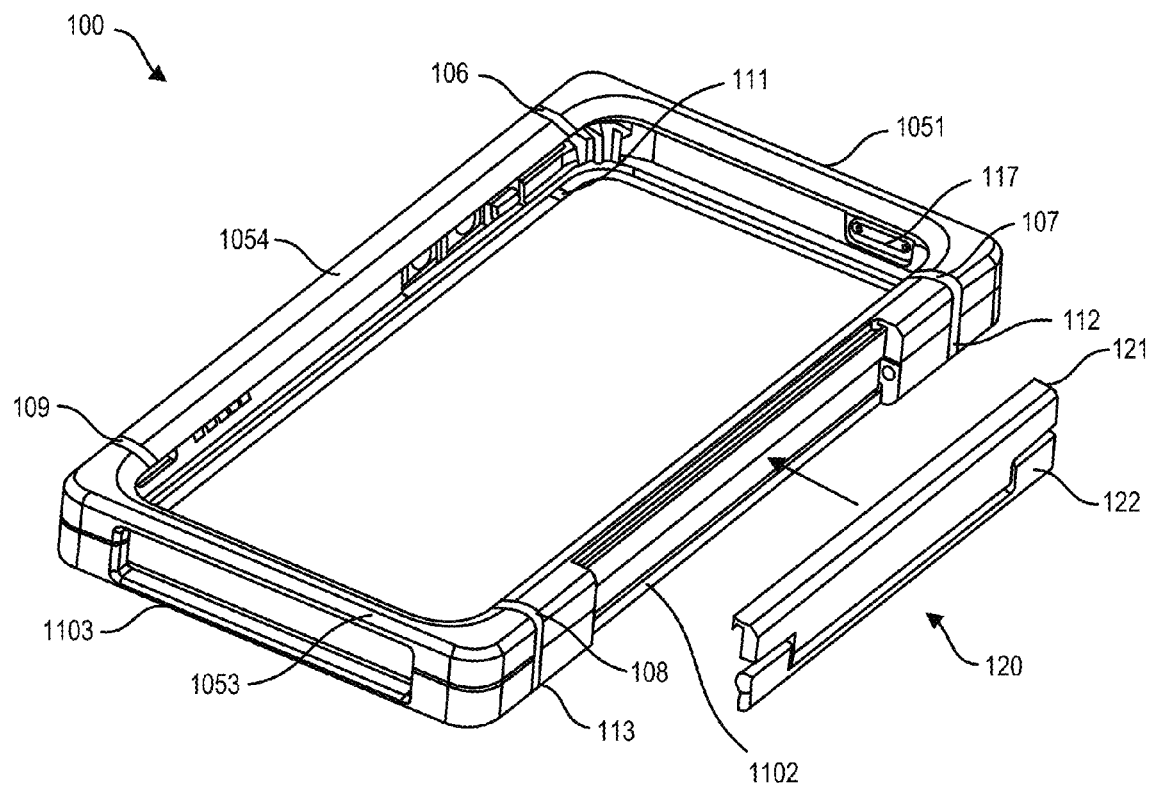
FIG. 32 illustrates a manufacturing step of installing a latch mechanism onto the metallic protective case.

FIG. 31 illustrates metallic protective case 100 without and/or before latch assembly 120 has been installed on metallic protective case 100. FIG. 32 illustrates a manufacturing step of installing latch assembly 120, including latch portions 121 and 122, onto metallic protective case 100. The assembly may be completed using the spring bars of FIGS. 17A and 17B.

Figure 6:
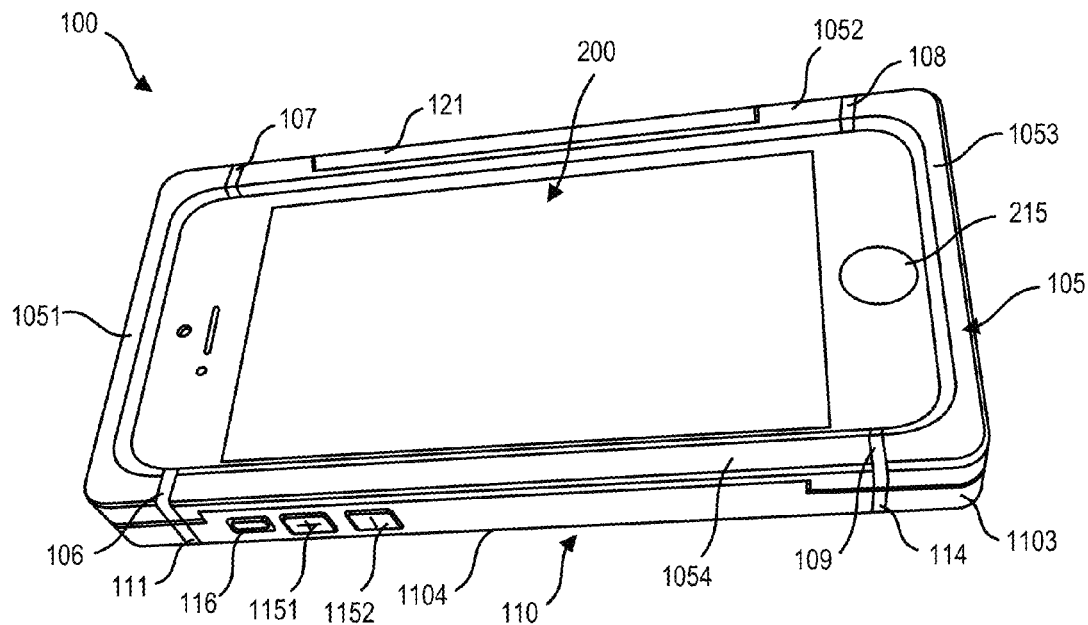
FIG. 6 illustrates a left side perspective view of a metallic protective case containing an electronic device.

FIG. 6 illustrates a left side perspective view of metallic protective case 100 with electronic device 200 installed. FIG. 6 illustrates button features 1151, 1152, and 116 in a side of metallic protective case 100 for accessing or interacting with buttons or switches of electronic device 200 while electronic device 200 is inside metallic protective case 100. Button features 1151, 1152, and 116 permit a user of the electronic device 200 to access or use buttons of the electronic 200 even though electronic device 200 is inside metallic protective case 100.

FIGS. 7-16 present various views and perspectives of protective of metallic protective case 100 without electronic device 200 installed. As discussed above, FIG. 7 illustrates a right side perspective view of metallic protective case 100 in an opened position. Portions of button features 1151, 1152, and 116 are visible inside of protective case 100.

Figure 9:
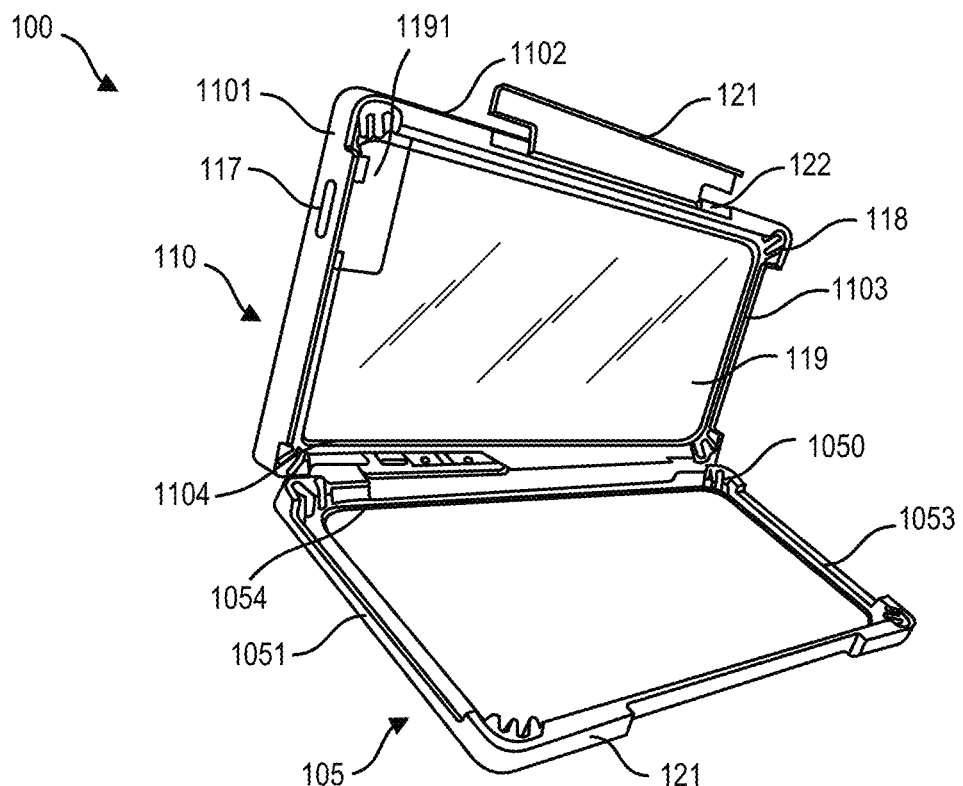
FIG. 9 illustrates a top perspective view of a metallic protective case in an opened position.
Figure 10:
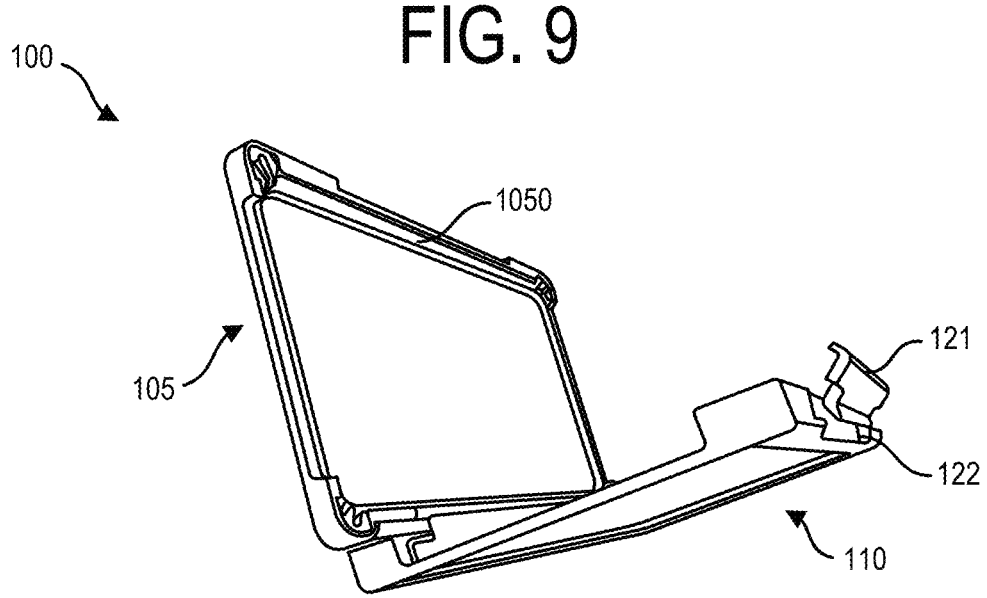
FIG. 10 illustrates a bottom perspective view of a metallic protective case in an opened position.
Figure 11:
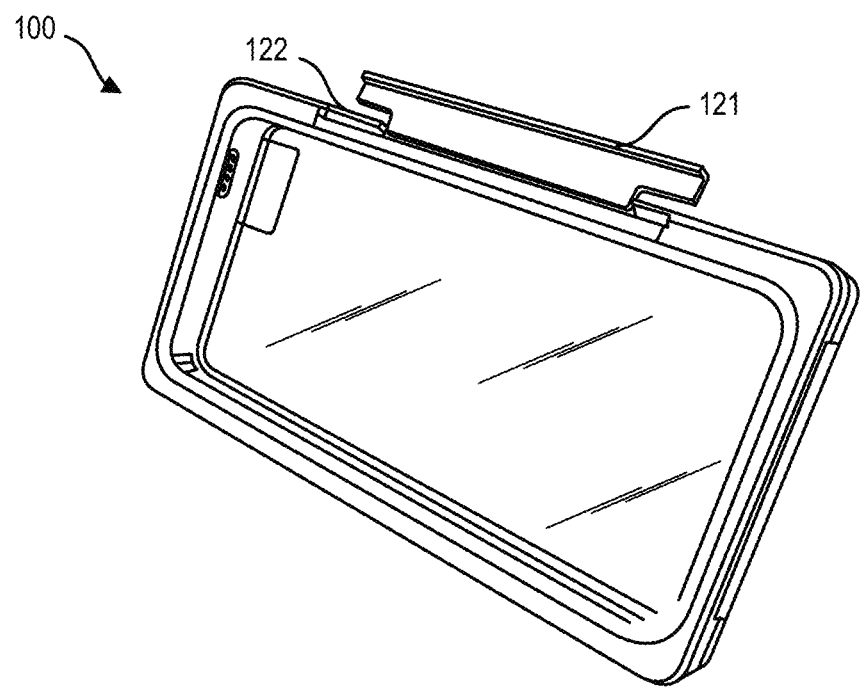
FIG. 11 illustrates a front perspective view of a metallic protective case in a closed position and having a latch in an opened position.
Figure 12:
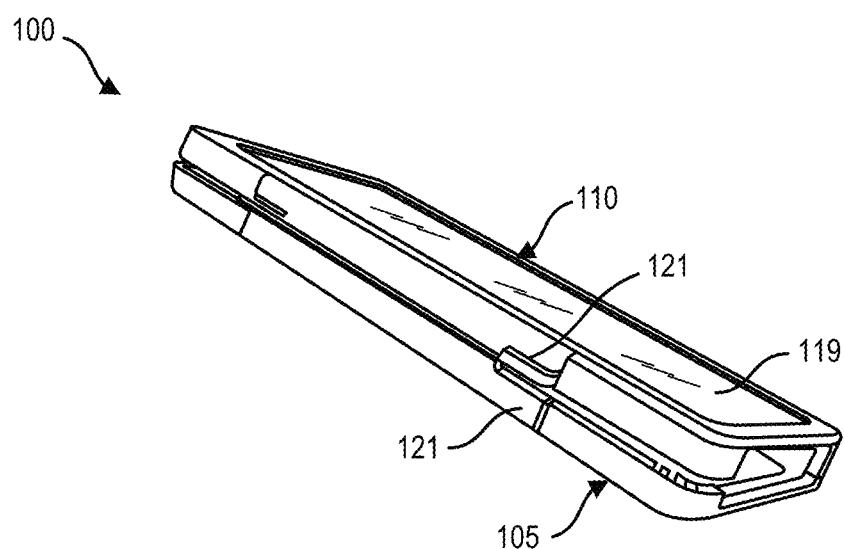
FIG. 12 illustrates a right side perspective view of a metallic protective case in a partially opened position.

FIG. 8 illustrates a left side perspective view of metallic protective case 100 in the opened position. FIG. 9 illustrates a top perspective view of metallic protective case in the opened position. FIG. 10 illustrates a bottom perspective view of metallic protective case 100 in the opened position. FIG. 11 illustrates a front perspective view of metallic protective case 100 in the closed position and having the latch in an opened position. FIG. 12 illustrates a right side perspective view of metallic protective case 100 in a partially opened position.

Metallic protective case 100 may also include one or more openings, ports, or apertures for accessing an electrical connector, electrical interface, and/or communication interface of electronic device 200 through a wall or other surface of metallic protective case 100. Metallic protective case 100 may include one or more doors, covers, bungs, or plugs for closing or covering these openings, ports, or apertures when not in use.

Figure 13:
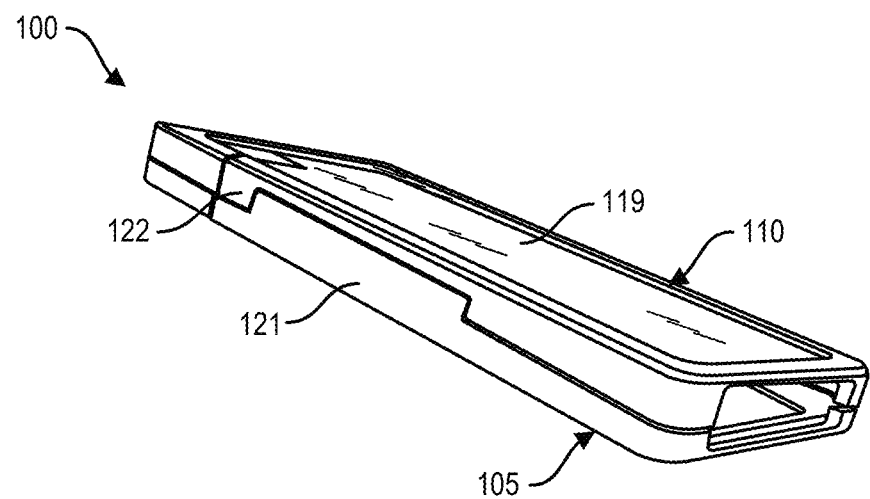
FIG. 13 illustrates a right side perspective view of a metallic protective case in a closed position.
Figure 14:
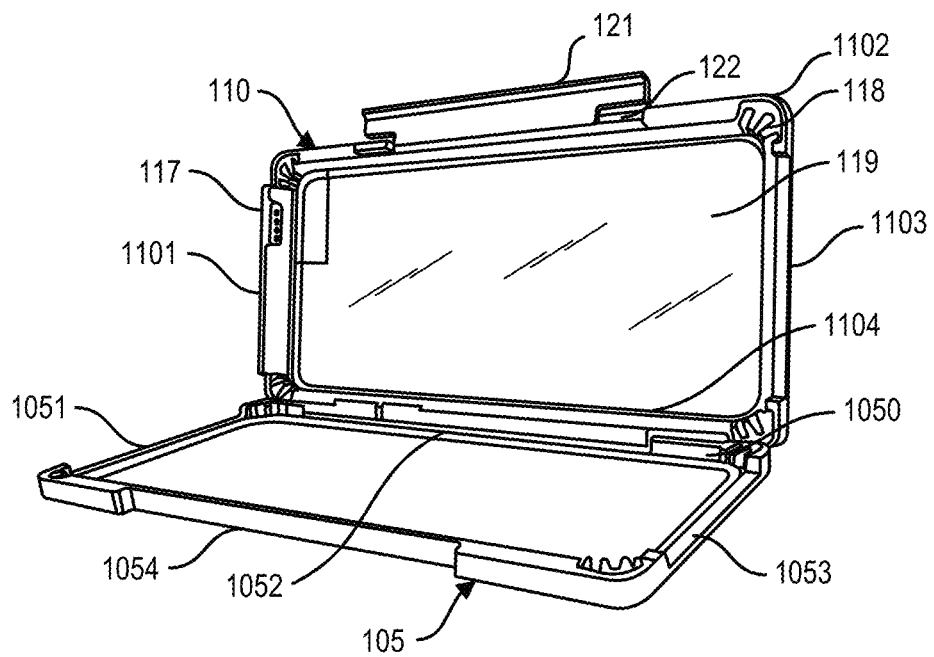
FIG. 14 illustrates a front perspective view of a metallic protective case in an opened position.
Figure 15:
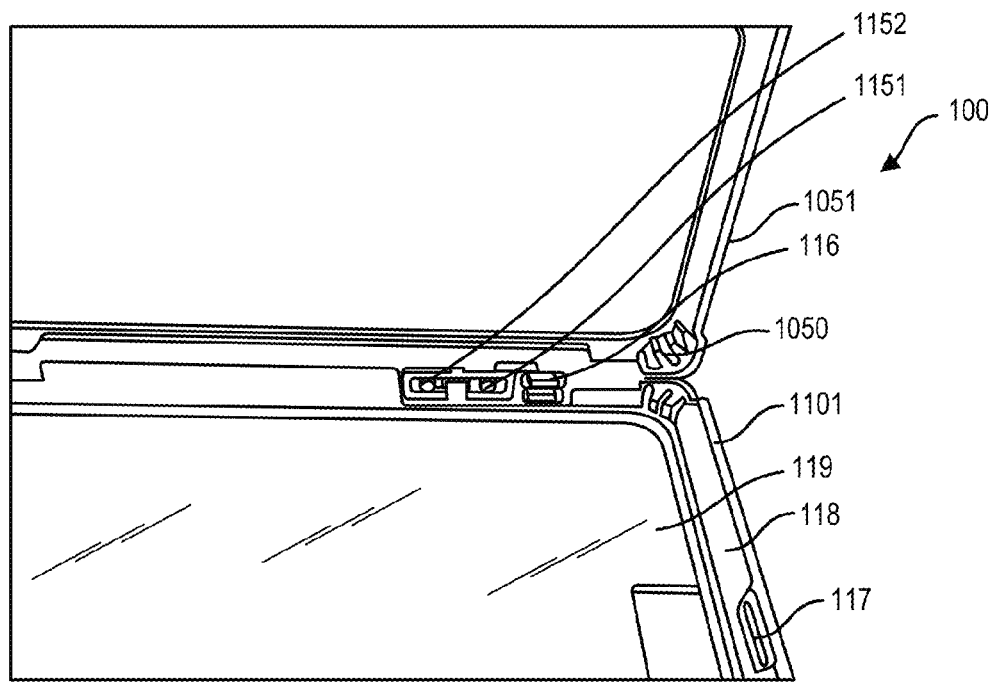
FIG. 15 illustrates a portion of an interior of a metallic protective case in an opened position.
Figure 16:
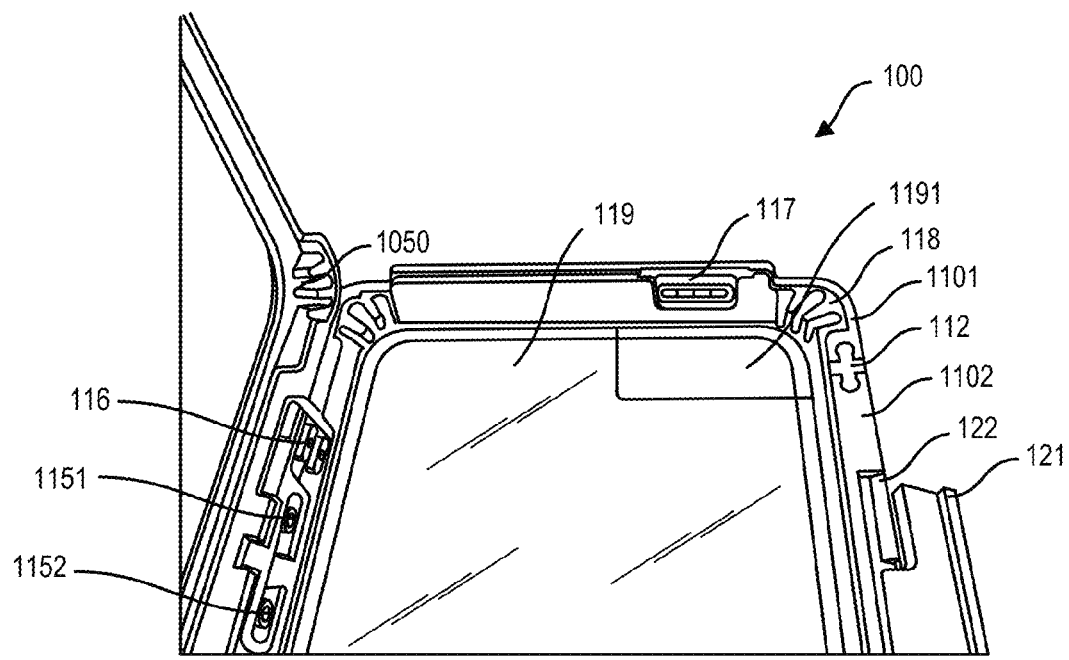
FIG. 16 illustrates a portion of an interior of a metallic protective case in an opened position.

FIG. 13 illustrates a right side perspective view of metallic protective case 100 in the closed position. Metallic case portions 105 and 100 contain recesses that receive latch components 121 and 122 when the case is in the closed and latched position such that latch components 121 and 122 are flush with the outer side surface of the case. FIG. 14 illustrates a front perspective view of metallic protective case 100 in the open position. FIG. 15 illustrates a portion of an interior of metallic protective case 100 in the opened position. FIG. 16 illustrates a portion of an interior of metallic protective case 100 in the opened position.

While the protective case illustrated in the figures discussed above is described as having two metallic portions, each of the metallic case portions may actually comprise more than a single metallic case portion. For example, first metallic case portion 105 may itself be made of one or more metallic portions.

Figure 25:
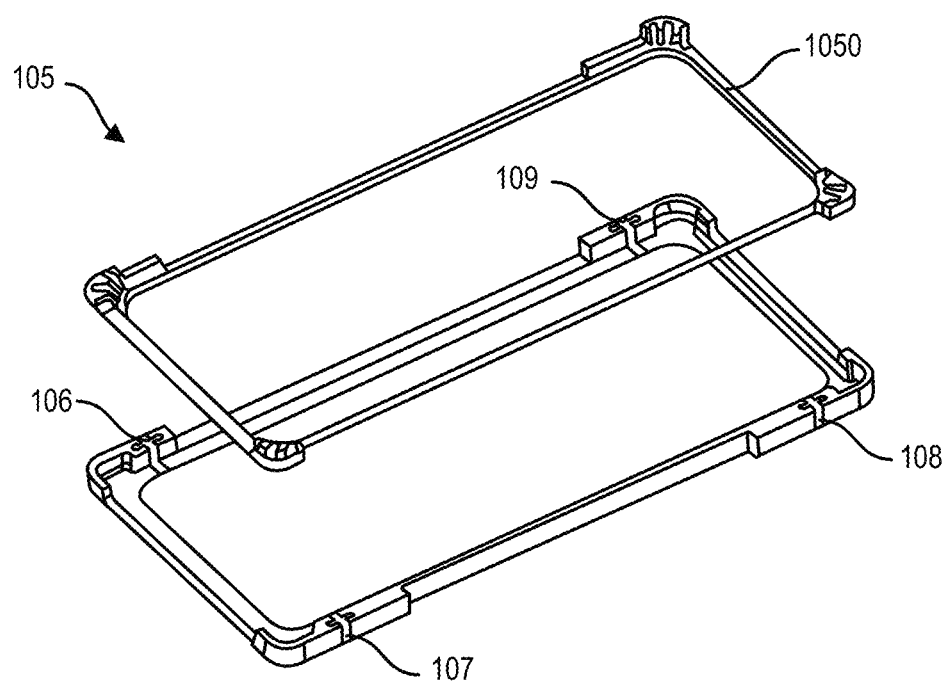
FIG. 25 illustrates a manufacturing step of overmolding or gluing a first cushion layer into a first cavity of a first metallic case portion.
Figure 26:
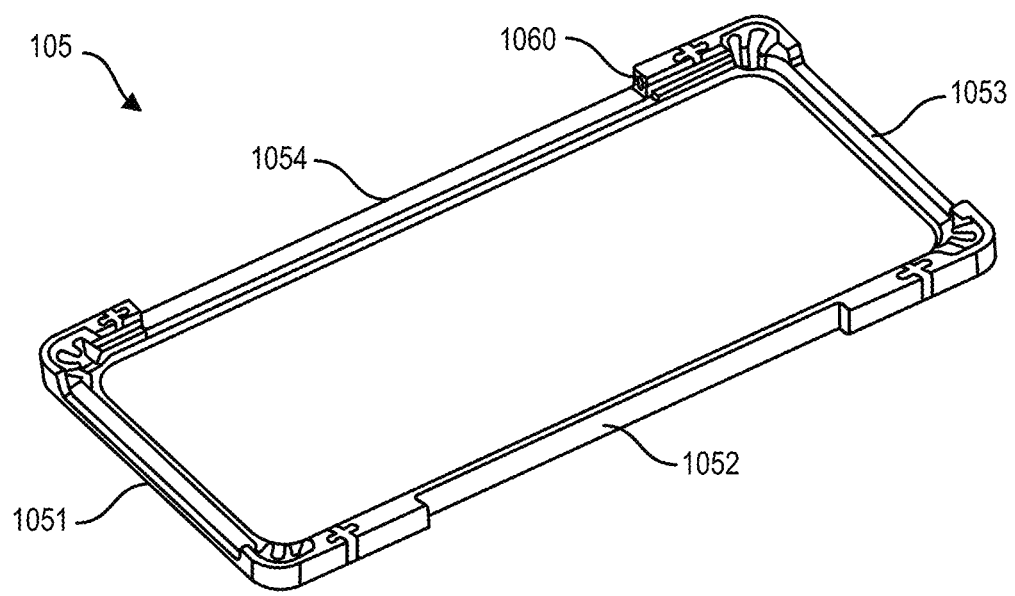
FIG. 26 illustrates the first cushion layer attached to the first metallic case portion.

For instance, as illustrated in FIGS. 25 and 26, the first metallic case portion 105 can be made of a first top portion 1051, a first right side portion 1052, a first bottom portion 1053, and a first left side portion 1054. Each of the top, bottom, right, and left portions may be or contain metallic components. The first top portion 1051 can be connected to the first left side portion 1054 by a first dielectric portion 106. The first top portion 1051 can be connected to the first right side portion 1052 by a second dielectric portion 107. The first right side portion 1052 can be connected to the first bottom portion 1053 by a third dielectric portion 108. The first bottom portion 1053 can be connected to the first left side portion 1054 by a fourth dielectric portion 109 as illustrated in FIG. 28A. In this way, these one or more portions of first metallic case portion 105 can be electrically isolated from each other.

Figure 27:
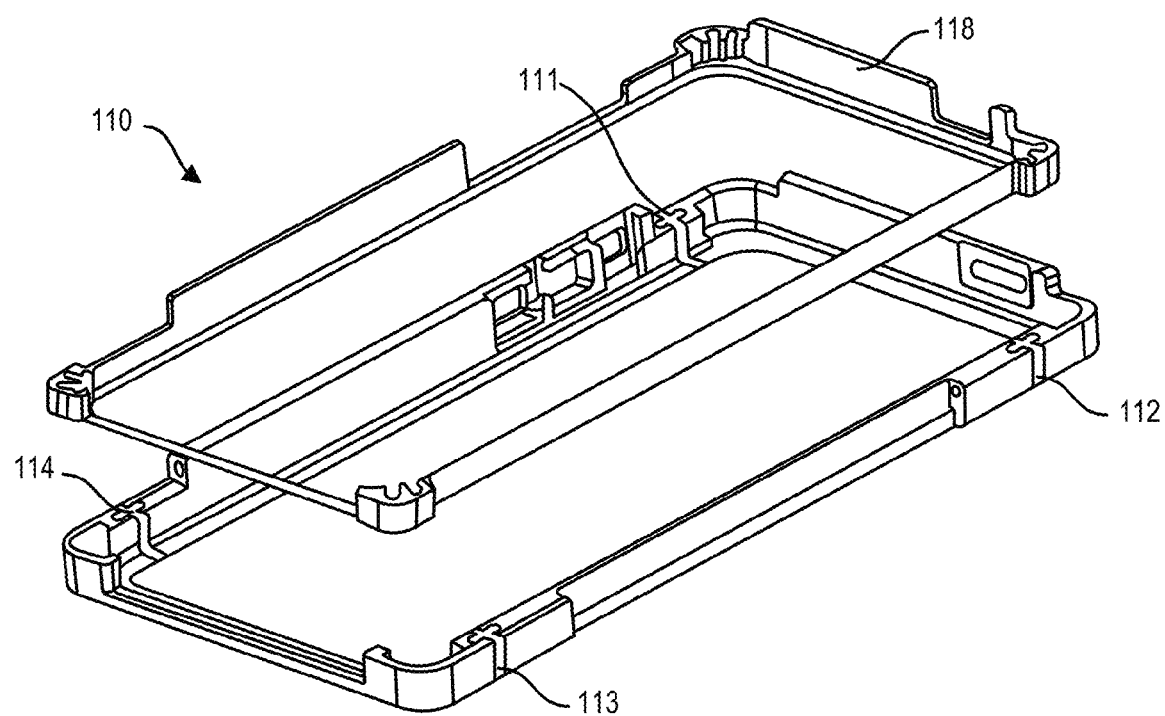
FIG. 27 illustrates a manufacturing step of overmolding or gluing a second cushion layer into a second cavity of a second metallic case portion.
Figure 28:
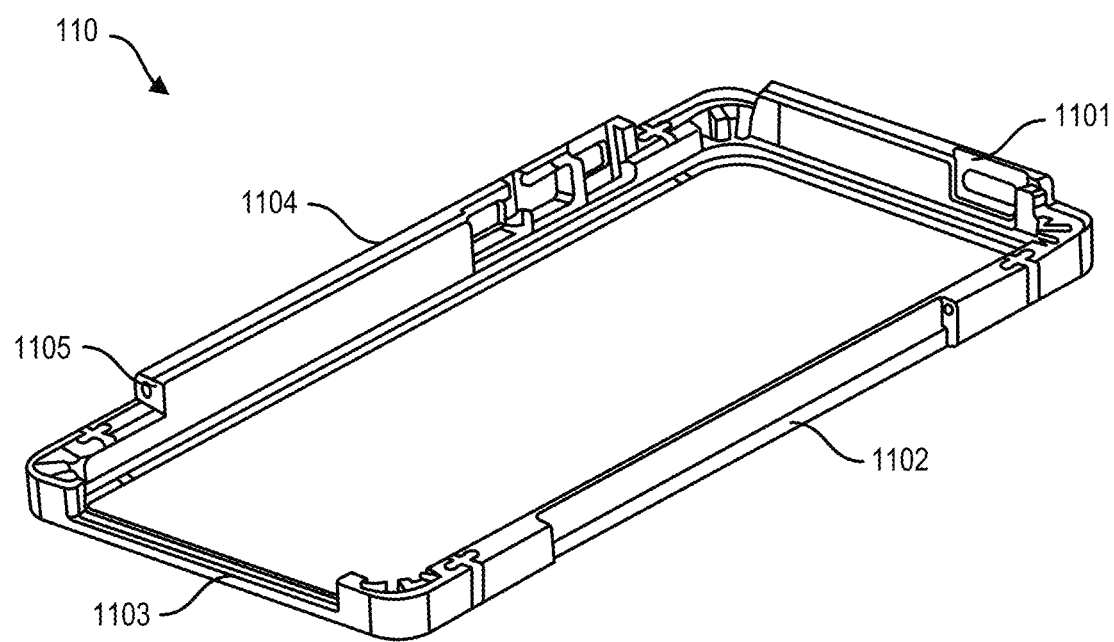
FIG. 28 illustrates the second cushion layer attached to the second metallic case portion.

The second metallic case portion 110 can also be made of one or more metallic portions. As illustrated in FIGS. 27 and 28, the second metallic case portion 110 can be made of a second top portion 1101, a second right side portion 1102, a second bottom portion 1103, and a second left side portion 1104. The second top portion 1101 can be connected to the second left side portion 1104 by a fifth dielectric portion 111. The second top portion 1101 can be connected to the second right side portion 1102 by a sixth dielectric portion 112. The second right side portion 1102 can be connected to the second bottom portion 1103 by a seventh dielectric portion 113. The second bottom portion 1103 can be connected to the second left side portion 1104 by an eighth dielectric portion 114.

As illustrated in FIGS. 25 and 26, dielectric portions 106-109 can fill bulbous voids, cavities, or openings in the first portions 1051-1054 of first metallic case portion 105 to prevent separation of the first metal portions after the dielectric portions have hardened following a manufacturing process, such as an injection molding process. In other words, the dielectric portions may expand into voids, cavities, or openings of the metallic case portions to permanently hold the metallic case portions together to form a larger case member or portion that is primarily metallic but has metallic sub-portions that are electrically isolated from each other. Although four sub-portions of first metallic case portion 105 are illustrated, first metallic case portion 105 may be broken into a different number of sub-portions that are held together by dielectric portions including two sub-portions, three sub-portions, five sub-portions, or more than five. In addition, first metallic case portion 105 may be broken into sub-portions having shapes or sizes different than those illustrated.

Similarly, dielectric portions 111-114 can fill bulbous voids or recesses in the second metal portions 1101-1104 to prevent separation of the second metal portions after the dielectric portions have hardened following an injection molding process. The dielectric portions described herein can be made of or include any suitable materials having the preferred insulating and/or dielectric properties, including ceramics or polymers having high dielectric constants. For example, an organic thermoplastic polymer, such as polyether ether ketone (PEEK), can be used to form the dielectric portions.

Metallic protective case 100 may also include an aperture for accessing a control panel, interactive control panel, touch screen, interactive touchscreen, or capacitive touchscreen of electronic device 200. The aperture permits a user to access the interactive panel or touch screen of electronic device 200 when electronic device 200 is enclosed or encased in metallic protective case 100. Metallic protective case 100 may also include a membrane or sheet over the aperture which provides further protection to electronic device 200 and/or seals the electronic device 200 inside metallic protective case 100 while still permitting the user to operate electronic device 200 through the membrane. Covering the aperture with a membrane may also permit protective case 100 to be water-resistant, waterproof, dust resistant, and/or dust proof when in the closed position. Protective case 100 may include one or more gaskets or seals and one or more seating or sealing surfaces so that members that make up protective case 100 seal to each other when protective case 100 is in the closed position to form a water-resistant or waterproof cavity.

In some configurations, a membrane in protective case 100 may include one or more thin sheets of a flexible plastic material that is transparent, or nearly transparent. In other configurations, the membrane may include one or more sheets of glass to protect the electronic device while still permitting the user to use, see, and/or interact with the electronic device. The membrane or glass sheet may be sufficiently thin to allow a user to operate a capacitive touchscreen of the electronic device through the membrane or glass sheet.

Figure 30:
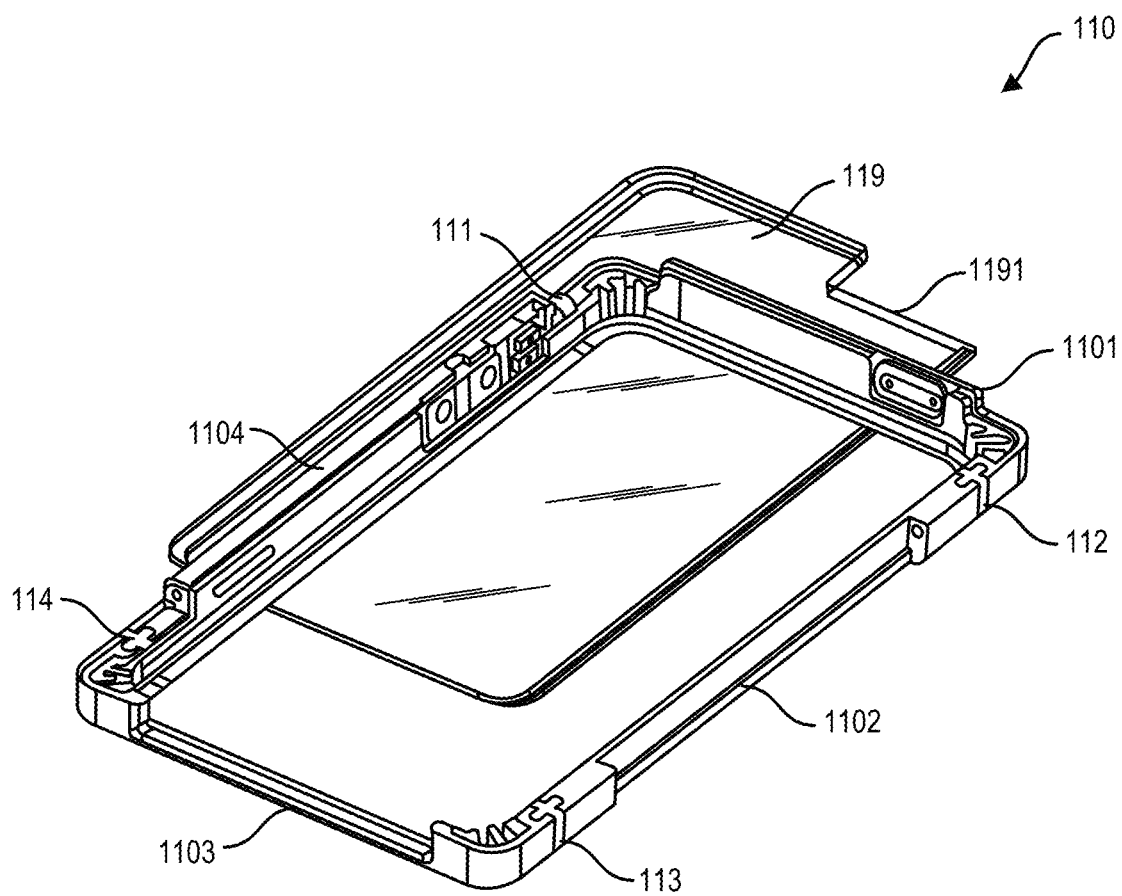
FIG. 30 illustrates a manufacturing step of installing a sheet of glass into the second cavity of the second metallic case portion to cover an opening in the second metallic case portion.

Furthermore, another element or portion of metallic protective case 100 may include a membrane or sheet providing visual access to a portion of electronic device 200 even if that portion of electronic device 200 does not include an interactive control panel or touch screen. For example, as illustrated in FIG. 7 and FIG. 30, second metallic case portion 110 includes a sheet of glass 119 within a cavity in the second metallic case portion 110. This sheet of glass makes the back of electronic device 200 visible through metallic protective case 100 even though the back of electronic device 200 may not include an interactive control panel or touchscreen. As with a sheet of glass on a front side of the protective case, glass 119 can be any suitable type of glass, such as alkali-aluminosilicate sheet toughened, strengthened, or ruggedized glass, including, for example, GORILLA GLASS. The sheet of glass can be adhered to the inner surface of any portion of the metallic case by any suitable method, such as using an adhesive. As illustrated in FIG. 7, glass 119 may include one or more openings, such as opening 1191, for a camera and/or flash of the electronic device. Even though glass 119 may be transparent, it may be desirable to include one or more opening, such as opening 1191, to reduce or eliminate reflections which may result from glass 119, particularly with respect to a flash element of the electronic device. While glass 119 is referred to as 'glass,' it may also be made of another transparent, or nearly transparent, material.

In one variation, second metallic case portion 110 may also receive a decorative insert that shows through glass 119. In this way, a user can easily customize and change the appearance of the protective case by simply adding or swapping a decorative insert. The decorative insert may be made of paper or thin plastic sheet. Alternatively, glass 119 may itself be a thin panel or sheet containing a decorative pattern and may be configured such that a user is able to change out the decorative panel to change the appearance of the case.

Metallic protective case 100 can be made of any suitable material or combination of materials. For example, the protective case 100 may be made of titanium, aluminum, steel, stainless steel, metallized materials, metal-coated materials, another suitable metal or alloy, or a combination thereof that can be machined, formed, forged, extruded, or cast. The first and second metallic case portions 105 and 110 can lend stiffness to protective case 100, thereby protecting the electronic device from crush or impact-induced damage. In certain instances, the first and second metallic case portions 105 and 110 can have thicknesses such as, for example, about 0.01-0.125, 0.01-0.25, or 0.01-0.375 inches. However, the thicknesses of the case portions can vary. For example, case portions 105 and 110 may be thicker along edges and corners to provide additional protection against crush and drop-induced damage to the electronic device 200.

If the metallic protective case 100 is made of titanium or a material with similar characteristics, a process for manufacturing the case may include hot forging. The hot forging process may require a series of molds to iteratively transform the raw titanium into a finished case or finished case portion. One or more machining process may also be required.

Figure 18:
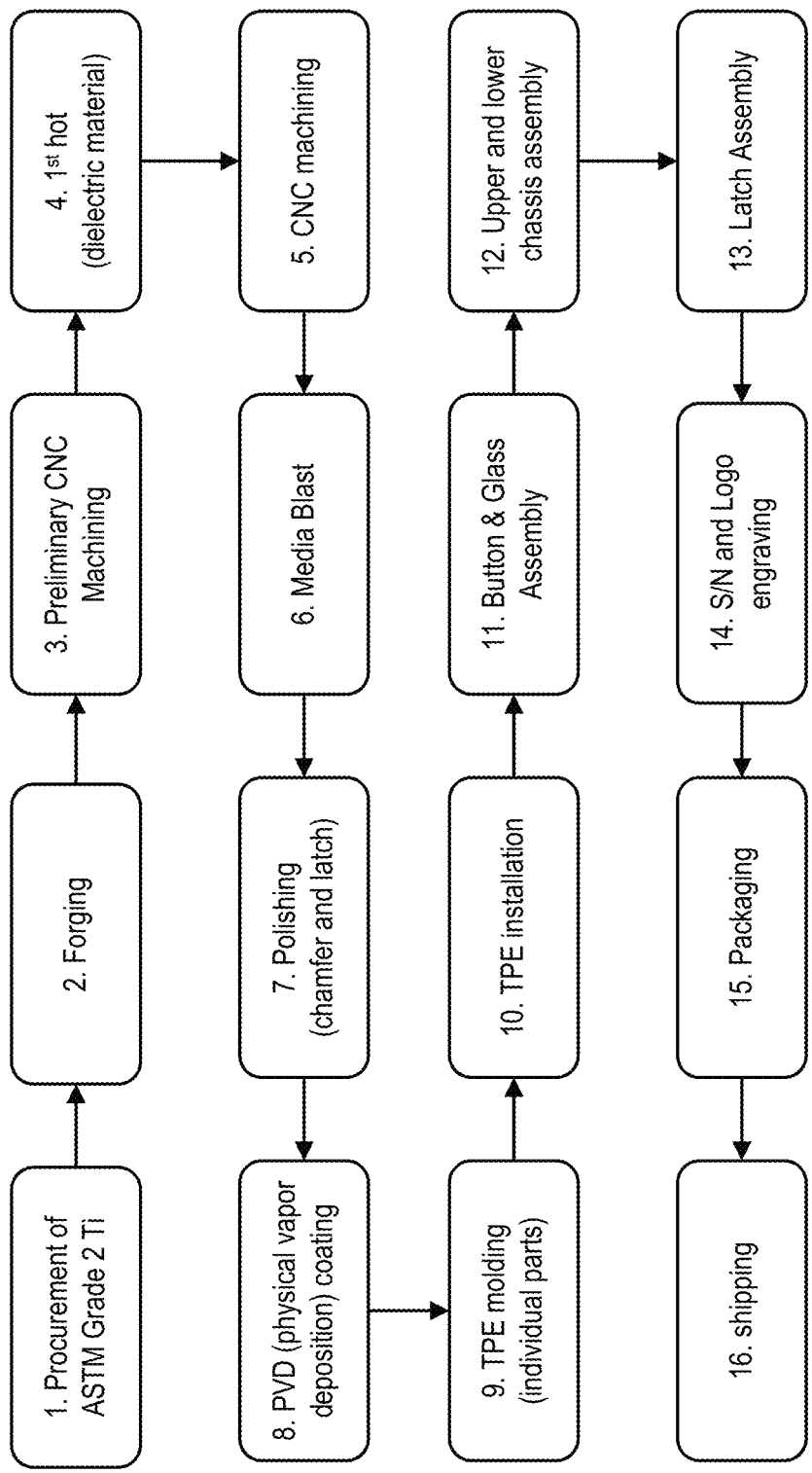
FIG. 18 illustrates a process flow chart for a method of manufacturing a metallic protective case.
Figure 19:
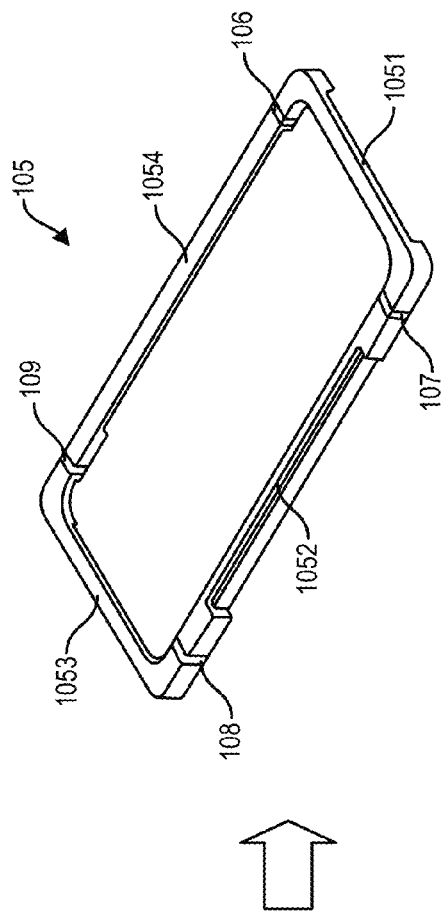
FIG. 19 illustrates a manufacturing step of machining a first metallic case portion to produce a front metallic case portion.
Figure 19:
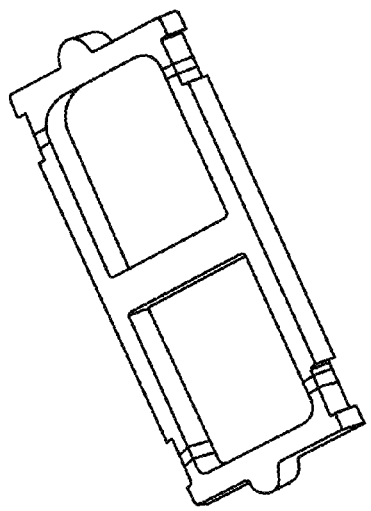
Figure 20:
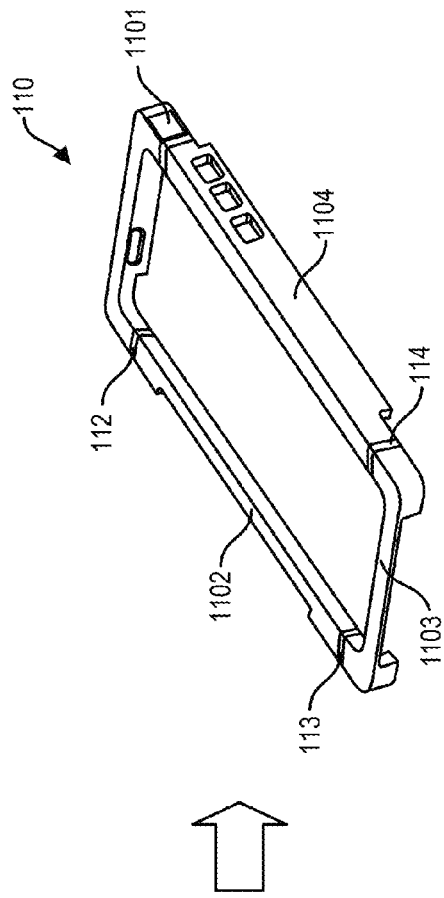
FIG. 20 illustrates a manufacturing step of machining a second metallic case portion to produce a back metallic case portion.
Figure 20:
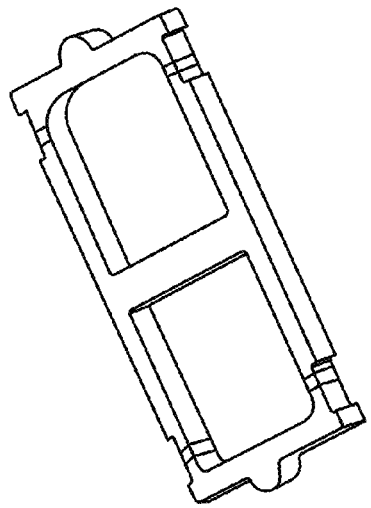

FIG. 18 illustrates one example of manufacturing a metallic protective case. However, all of the steps illustrated in FIG. 18 may not be required to produce a metallic protective case of the type described herein. In another example, additional manufacturing steps may be included. FIG. 19 illustrates a manufacturing step of machining rough portions of a metallic case that are already attached by insulating or dielectric portions to produce first metallic case portion 105. FIG. 20 illustrates a manufacturing step of machining rough portions of a metallic case that are already attached by insulator or dielectric portions to produce second metallic case portion 110.

In other methods, the bulbous voids which are eventually filled with the dielectric material after all the forging and machining processes have been completed. The bulbous voids may be filled with a dielectric material to join the parts and to reduce any interference affect the assembled metallic protective case may have on the operation of the antenna of the enclosed electronic device.

Figure 21:
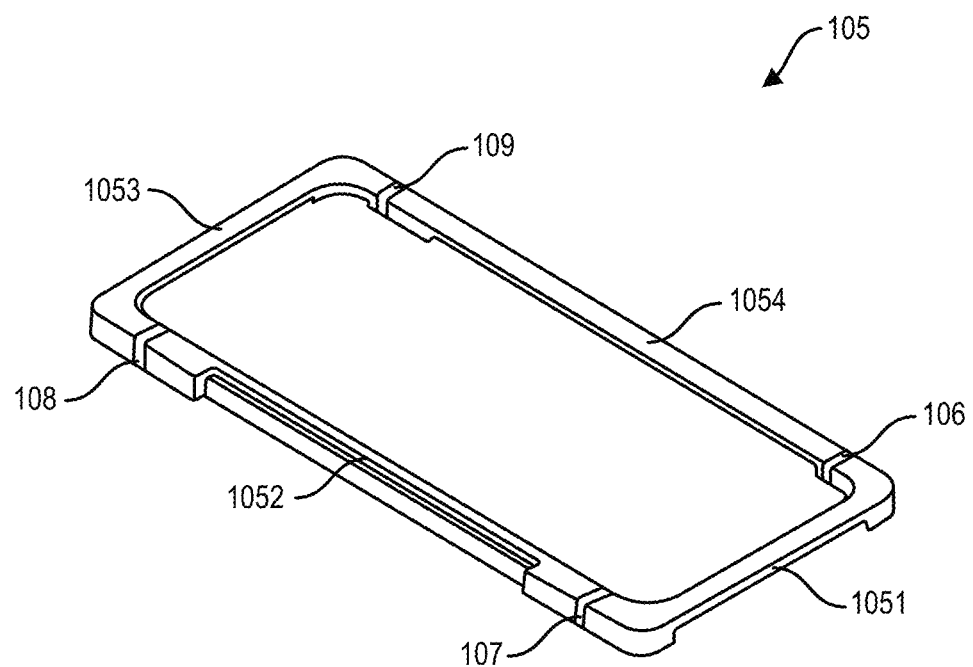
FIG. 21 illustrates a front metallic case portion.

As illustrated in FIG. 21, bulbous voids can be machined in case portions 1051-1054. The voids can then be filled with dielectric materials to form first dielectric material portion 106, second dielectric material portion 107, third dielectric material portion 108, and fourth dielectric material portion 109. Upon hardening, the dielectric material portions hold metallic case portions 1051-1054 together to form metallic case portion 105.

Figure 22:
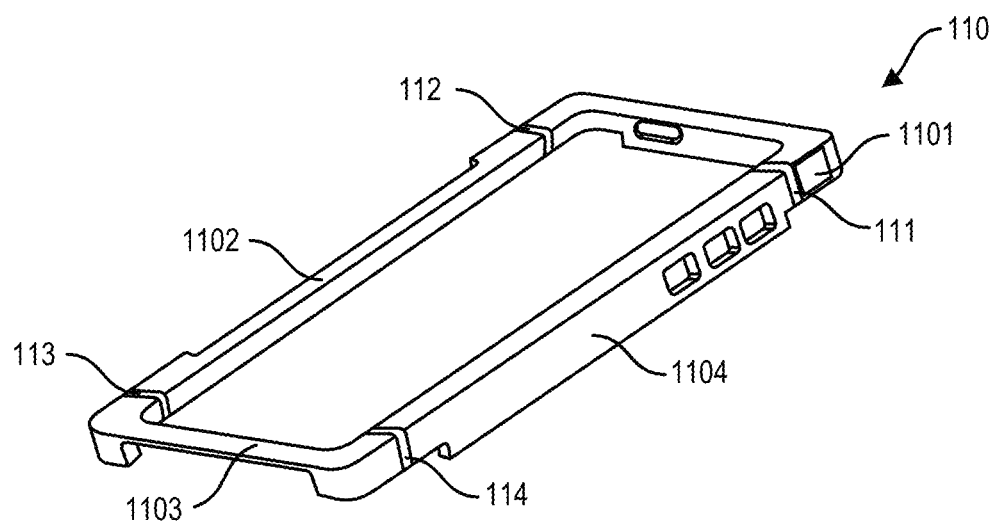
FIG. 22 illustrates a back metallic case portion.

As illustrated in FIG. 22, a bulbous void can be machined in the second top portion 1101 and a second bulbous void can be machined in the second right side portion 1102. The first and second voids can then be filled with a dielectric material to form the sixth dielectric portion 112, as shown in FIG. 28. Upon hardening in the first and second voids, the sixth dielectric portion 112 effectively joins the second top portion 1101 to the second right side portion 1102. These methods are used to create first metallic case portion 105 and second metallic case portion 110 that can be hingedly attached or connected to create a metallic protective case or metallic cover for an electronic device having an antenna structure. While 'bulbous' voids are discussed in most of the examples herein, the metallic portions of the case may contain features or structures of other shapes that enable the metallic portions to be held together when a material inside the features or structures hardens.

The first metallic case portion 105 can include a first cavity adapted to receive a front portion of electronic device 200. The first cavity can be defined by inner surfaces of the first top portion 1051, the first right side portion 1051, the first bottom portion 1052, and the first left side portion 1053. As illustrated in FIGS. 7 and 25, a first cushion layer 1050 can be disposed (e.g. overmolded, adhered, glued, or fastened) on one or more surfaces defining the first cavity. The first cushion layer 1050 can protect the electronic device 200 from impact-induced damage, for example, by dissipating or absorbing impact energy resulting from a drop. The first cushion layer 1050 can also serve to isolate the electronic device 200 from the first metallic case portion 105, thereby protecting exterior surfaces of the electronic device from being scratched, scuffed, or rubbed by the first metallic case portion. First cushion layer 1050 may also keep any outer metallic components of electronic device 200 electrically isolated from first metallic case portion 105. The first cushion layer 1050 can have a thickness of about 0.005 to 0.25, 0.005 to 0.1, 0.01 to 0.08, 0.01 to 0.06, 0.01 to 0.05, or 0.01 to 0.04 inches.

The second metallic case portion 110 can include a second cavity adapted to receive a rear portion of the electronic device 200. The second cavity can be defined by inner surfaces of the second top portion 1101, the second right side portion 1102, the second bottom portion 1103, and the second left side portion 1104. As illustrated in FIG. 9 and FIG. 27, second cushion layer 118 can be disposed (e.g. overmolded, adhered, glued, or fastened) on one or more surfaces defining the second cavity. The second cushion layer 118 can protect the electronic device 200 from impact-induced damage, for example, by dissipating or absorbing impact energy resulting from a drop. The second cushion layer 118 can also serve to isolate the electronic device 200 from the second metallic case portion 110, thereby protecting exterior surfaces of the electronic device from being scratched, scuffed, or rubbed by the second metallic case portion. Second cushion layer 118 may also keep any outer metallic components of electronic device 200 electrically isolated from second metallic case portion 110. The second cushion layer 118 can have a thickness of about 0.005 to 0.25, 0.005 to 0.1, 0.01 to 0.08, 0.01 to 0.06, 0.01 to 0.05, or 0.01 to 0.04 inches.

It should be understood that the cushion layers may have shapes other than the shapes illustrated in the figures herein. In addition, more or fewer cushion layers may be included. Furthermore, the cushion layers may be positioned in locations within the protective case other than the illustrated locations.

Figure 23:
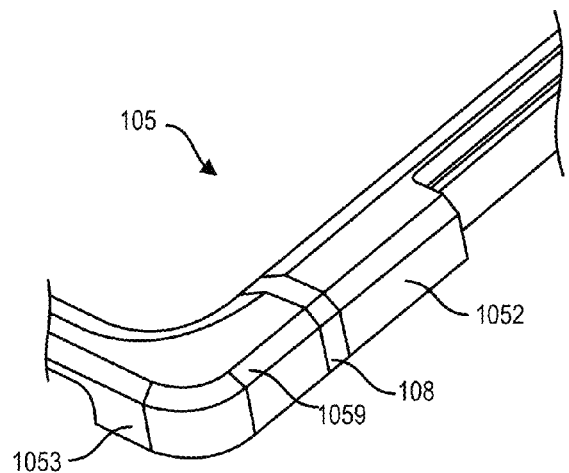
FIG. 23 illustrates machining a chamfer along the edge of the metallic protective case for user comfort.

FIG. 23 illustrates a chamfer 1059 machined or formed along an edge of metallic protective case 100. The chamfer may be added for purposes of giving metallic protective case 100 a sleeker design and/or for increasing user comfort when using the case.

Many companies have trade-in or buyback programs focused on purchasing and/or reselling used mobile electronic devices. Examples of companies with trade-in or buyback programs include GAZELLE, BESTBUY, BUYMYTRONICS, GLYDE, NEXTWORTH, RADIOSHACK, and TOTEM. When determining the value of a used electronic device, the company will commonly factor in the device's physical appearance. A device that has no visible signs of wear typically commands a higher resale value than a device that has visible signs of wear on exterior surfaces. Therefore, to increase the future potential resale value of an electronic device, it is desirable to prevent the device from being scratched, scraped, scuffed, rubbed, or chipped during a period of ownership.

Simply enclosing an electronic device in any case provides some protection but may not be adequate to prevent the electronic device from being scratched, scuffed, or rubbed. Many protective cases impart wear marks or scratches on the electronic device over time. For instance, some slider cases may scratch a device during installation if debris (e.g. sand, dust, or lint) is present between the device and an inner surface of the slider case. Other protective cases may result in marring due to subtle rubbing of the protective case against one or more surfaces of the electronic device over time. Marring can result in a glossy surface finish being reduced to a matte surface finish on certain portions of the electronic device, which is undesirable from a resale and aesthetic perspective. To avoid these outcomes, it can be desirable to have a protective case that effectively protects the electronic device against drop-induced damage but also does not impart visible signs of wear on exterior surfaces of the electronic device. To accomplish this objective, the protective case can provide air gaps, as described herein, that establish clearance volumes between the electronic device and inner surfaces of the protective case, thereby preventing formation of visible signs of wear on the electronic device.

The cushion layers described herein, such as cushion layers 1050 and 118, can be made of any suitable materials such as a saturated or unsaturated elastomer. Other examples of suitable materials include silicon rubbers and thermoplastic elastomers, including silicone-based thermoplastics. These material examples are not intended to be limiting and use of other materials is possible. The cushion layers can have any suitable hardness to provide a cushioning affect but to also hold the electronic device firmly in place inside the case. In one example, one or both of the cushion layers may have a hardness of about 30 to 70, 30 to 50, or 40 to 50 Shore A.

In some examples, a thermoplastic elastomer may be injection molded into the first and second cavities, respectively, of the first and second metallic case portions 105 and 110 to form the cushion layers. In some configurations only one or the other of the first and second metallic case portions may contain a cushion layer. The thermoplastic elastomer may have a melting point of about 410-450, 420-440, or 430 degrees Fahrenheit (F) and a mold within an injection molding machine may be maintained at a temperature of about 100 degrees F. To form a cushion layer, the thermoplastic elastomer can be injected into the respective cavity at a suitable temperature and pressure to ensure proper flow of the thermoplastic elastomer. After the cushion layer has been formed and the injection molding process is complete, the mold can then be opened, and a completed case portion with cushion layer can be removed from the mold.

As an alternative to the overmolding process described above, the first and/or second cushion layer can be injection molded as separate components, as shown, and affixed to one or more surfaces of the cavities during a secondary assembly process. During the secondary assembly process, each injection molded cushion layer can be affixed to the respective metallic case portion by, for example, applying an adhesive or an adhesive layer. Due to the additional manufacturing steps required to produce a separate cushion layer, using an overmolded cushion layer can be a more efficient approach. In addition, due to bonding that occurs on a molecular level, an overmolded cushion layer may be less likely to separate from the cavity than an injection molded cushion layer that is manufactured separately and then affixed to the cavity using an adhesive.

Cushion layers, such as cushion layer 1050 and/or cushion layer 118, may also each include one or more cushion layer portions. The cushion layer portions may be interconnected to form a continuous cushion layer over one or more surfaces of the first and/or the second cavities. Alternately, the cushion layer portions can be discrete cushion layer portions that are not interconnected or in contact with each other. For example, two cushion layer portions may be present in different areas of a single case portion without being in contact with each other. In yet another example, some of the cushion layer portions may be interconnected or in contact with each other while others are interconnected or in contact with each other.

Figure 29:
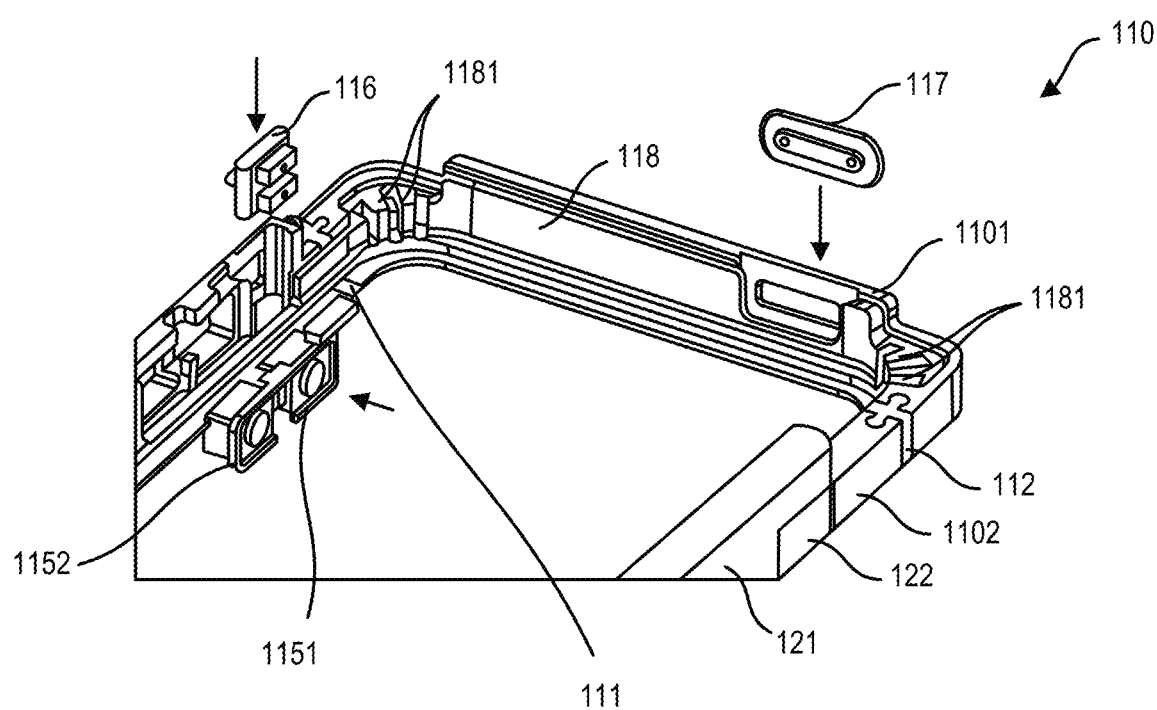
FIG. 29 illustrates a manufacturing step of installing and capturing a power button actuator between the second cushion layer and the second metallic case portion.

FIG. 29 illustrates a manufacturing step of installing and capturing a power button actuator 117 between the second cushion layer 118 and the second metallic case portion 110. Power button actuator 117 is a separate piece which is installed in protective case portion 110 such that it remains captured in protective case portion 110 yet is movable with respect to protective case portion 110. This allows a user to press power button actuator 110 from an outside of metallic protective case 100 such that it moves and can activate a power switch of electronic device 200 when electronic device 200 is inside metallic protective case 100. In other configurations, power button actuator 117 may not be a separate and may be formed in or from the second cushion layer and protrude through a hole in a wall of case portion 110.

FIG. 29 also illustrates button features 1151, 1152, and 116 which are installed into a side of case portion 110 for activating switches or buttons on the side of electronic device 200. Button features 1151, 1152, and 116 may be formed from a rigid material such as plastic and captured such that they are movable like power button actuator 117. Alternatively, one or more of button features 1151, 1152, and 116 may be formed from a flexible material, including from the material of a cushion layer, that flexes to allow a user to activate the switches or button of electronic device 200.

FIG. 29 further illustrates extended fingers 1181 in the corners of cushion layer 118. Fingers 1181 may provide additional shock protection and/or energy absorption at the corners of protective case element 110 for an electronic device housed inside metallic protective case 100. If dropped, an electronic device often first strikes a surface with one of its corners and this additional protection on the corners may provide increased protection for the device.

Metallic protective case 100 can be treated by any suitable process to further increase its durability, surface hardness, scratch resistance, or corrosion resistance. One or more portions of the metal protective case can be bead blasted, anodized, or coated. Suitable coating methods can include, for example, electroplating or physical vapor deposition (PVD) (e.g. cathode arc deposition, electron beam PVD, evaporative deposition, pulsed laser deposition, sputter deposition, spray-physical PVD). Suitable coatings can include, for example, chrome, nickel, ceramic, gold, platinum, palladium, titanium nitride, chromium nitride, titanium aluminum nitride, zinc, zirconium, titanium, zirconium nitride, silver, or a combination thereof.

Figure 33:
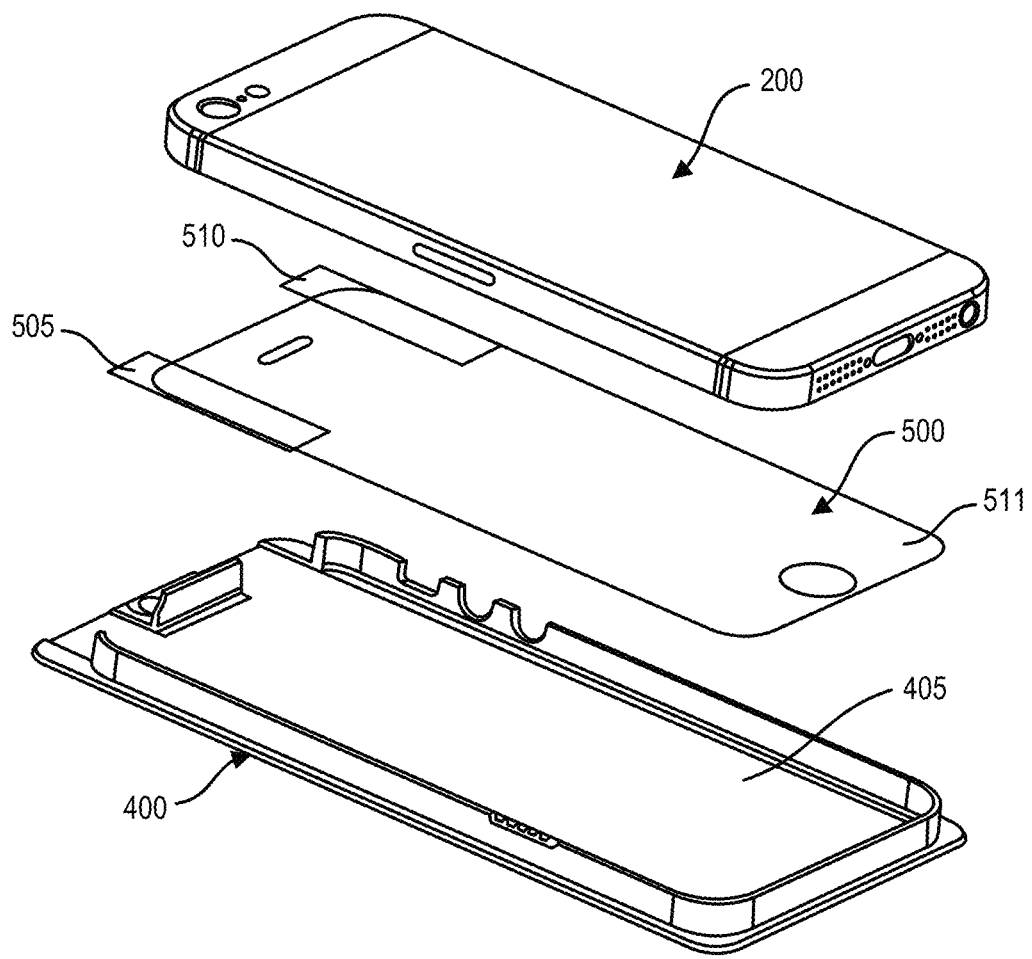
FIG. 33 illustrates installation of a screen protector on an electronic device.

To protect the front surface of the electronic device 200 from damage, it can be desirable to install a screen protector 500 on the electronic device, as illustrated in FIG. 33. The screen protector 500 can be made from a polymer, such as a urethane, a glass, such as alkali-aluminosilicate sheet toughened glass, or any other suitable material. The screen protector 500 can have a first surface and a second surface opposite the first surface. Prior to installation, the first surface of the screen protector 500 can be covered with a first protective covering 511 that can be removed by pulling on a first tab 510 adhered to the first protective covering. Similarly, the second surface of the screen protector 500 can be covered with a second protective covering that can be removed by pulling on a second tab 505 adhered to the second protective covering.

During installation of the screen protector 500 onto the electronic device 200, the screen protector may be first placed into a cavity 405 in a tray 400 with the second protective covering facing downward against a bottom surface of tray 400. Tray 400 can include locating features that provide precise positioning of screen protector 500 within the cavity 405 of the tray. The first tab 510 is then pulled to remove the first protective covering 511 from the screen protector 500, thereby exposing an adhesive layer on screen protector 500. The electronic device 200 is then lowered vertically into the cavity 405 in the tray 400 with the front surface of the electronic device facing downward. The cavity 405 of the tray 400 is defined by four walls.

In one example, the walls of tray 400 may each have a draft angle to guide the electronic device to the preferred position. In other examples, fewer than all of the walls of the cavity 405 may have draft angles (e.g. 1, 2, or 3 of the walls may have draft angles). The draft angles on the cavity walls allow a user to easily insert the device 200 into the cavity 405 while simultaneously achieving precise alignment of the screen protector 500 relative to the front surface of the electronic device 200. Due to the rigidity of the electronic device 200, when the user applies downward pressure to the device while it is resting in the cavity 405 of the tray 400, consistent pressure is applied against the screen protector across the entire surface area of the front surface of the electronic device, thereby resulting in a high-quality installation wherein the screen protector is free, or mostly free, of bubbles trapped between the screen protector and the front surface of the electronic device. Once the screen protector is adhered to the electronic device 200, the second tab 505 can be pulled to remove the second protective covering from the other side of screen protector 500, thereby completing the installation process. In some configurations, the screen protector may include only or the other of the protective coverings.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art. Other variations are possible as would be recognized by one skilled in the art. Therefore, the apparatuses, devices, systems, and methods disclosed herein are to be limited only by the claims.

The phrases "in some embodiments," "according to some embodiments," "in the embodiments shown," "in other embodiments," "in some examples," "in some cases," "in some situations," "in one configuration," "in another configuration," and the like generally mean that the particular feature, structure, or characteristic following the phrase is included in at least one embodiment of the present invention and/or may be included in more than one embodiment of the present invention. In addition, such phrases do not necessarily refer to the same embodiments or to different embodiments.

What is claimed is:

1. A protective case for an electronic device having an antenna, the protective case comprising:
   a first case member including at least two metallic case portions joined to each other by at least one electrical insulator segment that electrically isolates the at least two metallic case portions of the first case member from each other to reduce electromagnetic interference between the first case member and the antenna of the electronic device when the electronic device is installed in the protective case; and
   a second case member that attaches to the first case member to form an enclosure that at least partially encloses the electronic device when the electronic device is installed in the protective case.

2. The protective case of claim 1 wherein the at least one electrical insulator segment comprises a dielectric material.

3. The protective case of claim 2 wherein the dielectric material comprises a polymer, an organic polymer, porcelain, ceramic, or glass.

4. The protective case of claim 1 wherein the at least one electrical insulator segment includes at least two electrical insulator segments.

5. The protective case of claim 1, wherein the second case member includes at least two metallic case portions joined to each other by at least one electrical insulator segment.

6. The protective case of claim 5, wherein the second case member is electrically isolated from the first case member.

7. The protective case of claim 1 further comprising a hinge and wherein the first case member is attached to the second case member by the hinge to form the enclosure.

8. The protective case of claim 7 wherein one of the first case member and the second case member includes a first latch mechanism and the other of the first case member and the second case member includes a second latch mechanism that interfaces with the first latch mechanism to temporarily secure the protective case in a closed position.

9. The protective case of claim 1 further comprising a cushion layer for receiving the electronic device in the protective case.

10. The protective case of claim 9 wherein the cushion layer is overmolded onto one of the first case member and the second case member.

11. The protective case of claim 1 further comprising a button actuator in one the first case member and the second case member to enable a user to actuate a button of the installed electronic device from outside the protective case using the button actuator.

12. The protective case of claim 1 wherein one of the first case member and the second case member includes an aperture through which an interactive control panel of the electronic device is accessible by a user when the electronic device is installed in the protective case.

13. The protective case of claim 12 wherein the aperture is at least partially covered by a transparent membrane through which the interactive control panel of the electronic device can be operated by the user.

14. A protective case for an electronic device having an antenna, the protective case comprising:
   a first case element including a first metallic case portion and a second metallic case portion, the second metallic case portion joined to the first metallic case portion by a dielectric material that electrically isolates the second metallic case portion from the first metallic case portion to reduce any electromagnetic interference of the first case element to the antenna of the electronic device; and
   a second case element that interfaces with the first case element to form an enclosure that at least partially encloses the electronic device when the electronic device is installed in the protective case.

15. The protective case of claim 14 wherein the dielectric material comprises a polymer, an organic polymer, porcelain, ceramic, or glass.

16. The protective case of claim 14, wherein the second case element includes at least two electrically isolated metallic case portions.

17. The protective case of claim 14 further comprising a hinge and wherein the first case element is attached to the second case element by the hinge to form the enclosure and the protective case has a closed position and an open position for receiving the electronic device.

18. The protective case of claim 14 further comprising a cushioning layer for receiving the electronic device in the protective case.

19. A protective cover for an electronic device having an antenna, the protective cover comprising a case member including a cavity for receiving the electronic device, the case member at least partially enclosing the electronic device when the electronic device is installed in the cavity of the case member, the case member including at least two case portions, the at least two case portions of the case member each comprising one or more metallic materials, the at least two case portions joined to each other by a dielectric material that electrically isolates the at least two case portions from each other to reduce any electromagnetic interference between the case member and the antenna of the electronic device when the electronic device is installed in the protective cover.

20. The protective cover of claim 19 wherein the at least two case portions are three case portions each comprising the one or more metallic materials and wherein the three case portions are joined to each other by the dielectric material.

* * * * *